United States Patent
Ellis, Sr. et al.

(10) Patent No.: US 10,459,895 B2
(45) Date of Patent: Oct. 29, 2019

(54) DATABASE STORAGE MONITORING EQUIPMENT

(71) Applicant: Bank of America Corporation, Charlotte, NC (US)

(72) Inventors: David Charles Ellis, Sr., Palm Coast, FL (US); Michael Patrick McCormick, Bethlehem, PA (US); Raju Viziagopal Kakarlapudi, Franklin Park, NJ (US); Karen Wiles, San Antonio, TX (US)

(73) Assignee: Bank of America Corporation, Charlotte, NC (US)

( * ) Notice: Subject to any disclaimer, the term of this patent is extended or adjusted under 35 U.S.C. 154(b) by 242 days.

(21) Appl. No.: 15/465,114

(22) Filed: Mar. 21, 2017

(65) Prior Publication Data

US 2018/0276253 A1    Sep. 27, 2018

(51) Int. Cl.
| | | |
|---|---|---|
| *G06F 16/00* | (2019.01) | |
| *G06F 16/21* | (2019.01) | |
| *G06F 16/901* | (2019.01) | |
| *G06F 16/2453* | (2019.01) | |
| *H04L 12/24* | (2006.01) | |
| *H04L 29/08* | (2006.01) | |

(52) U.S. Cl.
CPC ........ *G06F 16/21* (2019.01); *G06F 16/24545* (2019.01); *G06F 16/9024* (2019.01); *H04L 41/5009* (2013.01); *H04L 67/1097* (2013.01)

(58) Field of Classification Search
CPC ...... G06F 16/00; G06F 16/1734; G06F 16/21; G06F 16/24545; G06F 16/9024
USPC ................................................ 707/600–899
See application file for complete search history.

(56) References Cited

U.S. PATENT DOCUMENTS

| | | |
|---|---|---|
| 6,035,306 A | 3/2000 | Lowenthal et al. |
| 6,611,867 B1 | 8/2003 | Bowman-Amuah |
| (Continued) | | |

FOREIGN PATENT DOCUMENTS

| | | |
|---|---|---|
| CN | 105843904 A | 8/2016 |

OTHER PUBLICATIONS https://en.wikipedia.org/wiki/Database, pp. 1-22, site visited on Mar. 21, 2017.
(Continued)

*Primary Examiner* — Michelle N Owyang
(74) *Attorney, Agent, or Firm* — Banner & Witcoff, Ltd.; Michael A. Springs

(57) ABSTRACT

Equipment, tools, systems, storage media, and methods that allow a user to monitor database storage at various granularities and set thresholds for generating alerts are described. In one aspect, a system includes a client device configured to execute an application, a database configured to support the client device, a storage array configured to provide information to the database, and a computing device. The computing device may execute a Database Storage Throughput Analyzer (DSTA) tool, specify an interval, specify a particular database cluster of the database, specify a service level objective for controlling communications between the database and the storage array, generate a query, receive storage throughput measurements for the database, and apply the query to the storage throughput measurements to aid users in identifying database storage issues.

18 Claims, 26 Drawing Sheets

(56) References Cited

U.S. PATENT DOCUMENTS

| | | | |
|---|---|---|---|
| 6,845,344 B1 | 1/2005 | Lally et al. | |
| 7,395,537 B1 * | 7/2008 | Brown | G06F 16/217 |
| | | | 718/104 |
| 10,333,799 B2 * | 6/2019 | Bingham | H04L 41/5032 |
| 2004/0193827 A1 | 9/2004 | Mogi et al. | |
| 2004/0230872 A1 * | 11/2004 | Mullally | G06F 11/008 |
| | | | 714/38.14 |
| 2008/0243866 A1 | 10/2008 | Pandey | |
| 2010/0114870 A1 * | 5/2010 | Al-Omari | G06F 16/24524 |
| | | | 707/718 |
| 2010/0262633 A1 | 10/2010 | Bhattacharjee et al. | |
| 2011/0029882 A1 * | 2/2011 | Jaisinghani | H04L 41/12 |
| | | | 715/736 |
| 2012/0047287 A1 | 2/2012 | Chiu et al. | |
| 2015/0302034 A1 | 10/2015 | Sitaram et al. | |

OTHER PUBLICATIONS https://en.wikipedia.org/wiki/Storage_area_network, pp. 1- 6, site visited on Mar. 21, 2017.

Thor Olavsrud, "Splunk updates platform, adds monitoring and analytics services," http://www.cio.com/article/2985474/business-analytics/splunk-updates-platform-adds-monitoring-and-analytics-service.html, pp. 1-5, dated Sep. 23, 2015.

https://en.wikipedia.org/wiki/Splunk, pp. 1-4, site visited Mar. 21, 2017.

https://www.splunk.com/, pp. 1-5, site visited Mar. 21, 2017.

* cited by examiner

FIG. 7

Copy and Paste Contents (CASE) of the ASCII Text File into SPLUNK Dashboard Query Builder of the Storage Group's designated SPLUNK Dashboard

Copy and Paste Contents (CASE) of the ASCII Text File into SPLUNK Dashboard Query Builder of the Storage Group's designated SPLUNK Dashboard

905

Device="dm-20" OR Device="dm-19" OR Device="dm-18" OR Device="dm-17" OR Device="dm-16" OR Device="dm-15" OR Device="dm-14" OR Device="dm-13" OR Device="dm-12" OR Device="dm-11" OR Device="dm-8" OR Device="dm-10" OR Device="dm-9"

FIG. 9C

CASE DATA INSERTED INTO QUERY

```
<!-- Builds Host Dropdown list and sets host choice variables. -->

<input type="dropdown" searchWhenChanged="true" token="host">
<label>Select a Server:</label>
<search>
<query>index=$index$ host="[host name]" | table host | dedup host</query>
<earliest>-15m@m</earliest>
<latest>now</latest>
</search>
<choice value="*">Select Server</choice>
<fieldForLabel>host</fieldForLabel>
<fieldForValue>host</fieldForValue>
<default>sdna16*pdbpri*</default>
</input>

<!-- Builds Time Range Dropdown List and sets time range choice variables. -->

<input type="time" searchWhenChanged="false">
<label>Select a Time Frame:</label>
<default>
<earliestTime>-15m@m</earliestTime>
<latestTime>now</latestTime>
</default>
</input>

<input type="dropdown" searchWhenChanged="false" token="timeSpan">
<label>Select a Granularity:</label>
<default>span=1m</default>
<choice value="span=1m">1 Minute</choice>
<choice value="span=5m">5 Minutes</choice>
<choice value="span=15m">15 Minutes</choice>
<choice value="span=30m">30 Minutes</choice>
<choice value="span=60m">60 Minutes</choice>
<choice value="span=24h">24 Hours</choice>
</input>
</fieldset>

<!-- Start HTML Menu | Dashboard Row 1 -->
```

```
<!-- Builds links to other Dashboards, External Utilities, Knowledgebase, and Prod1 and Prod2 Up/down Status' -->
<row>
<pane>
<html>
<style type="text/css">
.tg {border-collapse:collapse;border-spacing:0;border-width:0px;border-style:solid;}
.tg td{font-family:Arial, sans-serif;font-size:14px;padding:0px 5px;border-style:solid;border-width:0px;overflow:hidden;word-break:normal;}
.tg th{font-family:Arial, sans-serif;font-size:14px;font-weight:normal;padding:0px 5px;border-style:solid;border-width:0px;overflow:hidden;word-break:normal;}
.tg .tg-lqy6{text-align:left;vertical-align:top}
.tg .tg-yw4l{vertical-align:top}
</style>
<table class="tg" width="100%">
<tr>
  <th class="tg-lqy6">
    <a href="../ui/P3D_VA_IO_SHARED_DISK_GROUP_Analysis=en-US/app/ui/P3D_VA_IO_SHARED_DISK_GROUP_Analysis">Cluster</a> |
    <a href="../ui/P3D_VA_IO_DISK_GROUP_Analysis_LDSNA16APDBPRI">Node1</a> |
    <a href="../ui/P3D_VA_IO_DISK_GROUP_Analysis_LDSNA16BPDBPRI">Node2</a> |
    <a href="https://uni-1786:8443/unimax/" target="new">SAN</a> |
    <a href="http://███████████████████████5" target="new">MyCTO</a> |
  </th>
  <th class="tg-yw4l">
    <a href="https://██████████████████████s">TX:</a>
    <div>
      <frame width="90" src="https://████████████████.html" frameborder="0" scrolling="no" height="25"/>
    </div>
  </th>
  <th class="tg-yw4l">
    <a href="https://██████████████████████s">VA:</a>
    <div>
      <frame width="90" src="https://████████████████.html" frameborder="0" scrolling="no" height="25"/>
    </div>
  </th>
```

```
<th class="bgyw41" align="right">
<form Target="_blank" method="GET" action="http://███████
███████.aspx">
<input type="hidden" name="sq" value="1"/>
<input type="text" name="k" placeholder="knowledgebase"/>
<input type="hidden" name="cs" value="This List"/>
<input type="hidden" name="u" value="http://████████
████"/>
</form>
</th>
</tr>
<table>
</html>

</panel>
</row>
```

```
<!-- Start Dashboard Row 2 -->

<row>
  <panel>
    <chart>
      <title>Disk Group MBs/sec - $timeSpan$ interval</title>
      <search>
        <query>index=$index$ sourcetype=iostat host="$host$" $device$ | eval rMBS=(wKB_PS/1024) | eval wMBS=(wKB_PS/1024) | eval tMBS=(rMBS+wMBS) | timechart $timeSpan$ sum(tMBS) by host | eval threshold=$mbcio$</query>
      </search>
      <option name="charting.axisLabelsX.majorLabelStyle.overflowMode">ellipsisNone</option>
      <option name="charting.axisLabelsX.majorLabelStyle.rotation">-0</option>
      <option name="charting.axisTitleX.visibility">collapsed</option>
      <option name="charting.axisTitleY.visibility">collapsed</option>
      <option name="charting.axisTitleY2.visibility">visible</option>
      <option name="charting.axisX.scale">linear</option>
      <option name="charting.axisY.scale">linear</option>
      <option name="charting.axisY2.enabled">0</option>
      <option name="charting.axisY2.scale">inherit</option>
      <option name="charting.chart">bar</option>
      <option name="charting.chart.bubbleMaximumSize">50</option>
      <option name="charting.chart.bubbleMinimumSize">10</option>
      <option name="charting.chart.bubbleSizeBy">area</option>
      <option name="charting.chart.nullValueMode">connect</option>
      <option name="charting.chart.showDataLabels">none</option>
      <option name="charting.chart.sliceCollapsingThreshold">0.01</option>
      <option name="charting.chart.stackMode">stacked</option>
      <option name="charting.chart.style">shiny</option>
      <option name="charting.drilldown">all</option>
      <option name="charting.layout.splitSeries">0</option>
      <option name="charting.layout.splitSeries.allowIndependentYRanges">0</option>
      <option name="charting.legend.labelStyle.overflowMode">ellipsisMiddle</option>
      <option name="charting.legend.placement">bottom</option>
      <option name="charting.chartoverlayFields">threshold</option>
      <option name="charting.chart.overlayFields">threshold</option>
      <option name="colorBy">value</option>
      <option name="colorMode">none</option>
      <option name="numberPrecision">0</option>
      <option name="showSparkline">1</option>
      <option name="showTrendIndicator">1</option>
      <option name="trendColorInterpretation">standard</option>
      <option name="trendDisplayMode">absolute</option>
      <option name="useColors">0</option>
      <option name="useThousandSeparators">1</option>
    </chart>
  </panel>
```

```xml
<!-- Creates IOP/s Panel: Builds Query, Calculates Output, and Formats Results into Chart -->
<panel>
<chart>
<title>Disk Group IOPS/sec - $timeSpan$ interval</title>
<search>
<query>index=$index$ sourcetype=iostat host="$host$" $device$ | eval tReq=(rReq_PS + wReq_PS) | timechart $timeSpan$ sum(tReq) by host | eval threshold=$iosio$</query>
</search>
<option name="charting.axisLabelsX.majorLabelStyle.overflowMode">ellipsisNone</option>
<option name="charting.axisLabelsX.majorLabelStyle.rotation">0</option>
<option name="charting.axisTitleX.visibility">collapsed</option>
<option name="charting.axisTitleY.visibility">collapsed</option>
<option name="charting.axisTitleY2.visibility">visible</option>
<option name="charting.axisX.scale">linear</option>
<option name="charting.axisY.scale">linear</option>
<option name="charting.axisY2.enabled">0</option>
<option name="charting.axisY2.scale">linear</option>
<option name="charting.chart">bar</option>
<option name="charting.chart.bubbleMaximumSize">50</option>
<option name="charting.chart.bubbleMinimumSize">10</option>
<option name="charting.chart.bubbleSizeBy">area</option>
<option name="charting.chart.nullValueMode">connect</option>
<option name="charting.chart.showDataLabels">none</option>
<option name="charting.chart.sliceCollapsingThreshold">0.01</option>
<option name="charting.chart.stackMode">stacked</option>
<option name="charting.chart.style">shiny</option>
<option name="charting.drilldown">all</option>
<option name="charting.layout.splitSeries">0</option>
<option name="charting.layout.splitSeries.allowIndependentYRanges">0</option>
<option name="charting.legend.labelStyle.overflowMode">ellipsisEnd</option>
<option name="charting.legend.placement">bottom</option>
<option name="charting.chart.overlayFields">threshold</option>
</chart>
</panel>
</row>
```

```xml
<!-- Start Dashboard Row 3 -->
<!-- Creates AWAIT Panel: Builds Query, Calculates Output, and Formats Results into Chart -->
<row>
  <panel>
    <chart>
      <title>Disk Group AWAIT/ms - $timeSpan$ interval</title>
      <search>
        <query>index=$index$ sourcetype=iostat host="$host$" $device$ | timechart $timeSpan$ avg(avgWaitMillis) by host</query>
      </search>
      <option name="charting.axisLabelsX.majorLabelStyle.overflowMode">ellipsisNone</option>
      <option name="charting.axisLabelsX.majorLabelStyle.rotation">0</option>
      <option name="charting.axisTitleX.visibility">collapsed</option>
      <option name="charting.axisTitleY.visibility">visible</option>
      <option name="charting.axisTitleY2.visibility">visible</option>
      <option name="charting.axisX.scale">linear</option>
      <option name="charting.axisY.scale">linear</option>
      <option name="charting.axisY2.enabled">0</option>
      <option name="charting.axisY2.scale">inherit</option>
      <option name="charting.chart">bar</option>
      <option name="charting.chart.bubbleMaximumSize">50</option>
      <option name="charting.chart.bubbleMinimumSize">10</option>
      <option name="charting.chart.bubbleSizeBy">area</option>
      <option name="charting.chart.nullValueMode">connect</option>
      <option name="charting.chart.showDataLabels">none</option>
      <option name="charting.chart.sliceCollapsingThreshold">0.01</option>
      <option name="charting.chart.stackMode">stacked</option>
      <option name="charting.chart.style">shiny</option>
      <option name="charting.drilldown">all</option>
      <option name="charting.layout.splitSeries">0</option>
      <option name="charting.layout.splitSeries.allowIndependentYRanges">0</option>
      <option name="charting.legend.labelStyle.overflowMode">ellipsisMiddle</option>
      <option name="charting.legend.placement">bottom</option>
      <option name="charting.axisTitleY.text">Milliseconds</option>
      <option name="charting.axisY.minimumNumber">0</option>
      <option name="charting.axisLabelsY.majorUnit">5</option>
    </chart>
  </panel>
```

FIG. 10H

```
<!-- Creates Service Time Panel: Builds Query, Calculates Output, and Formats Results into Chart -->
<panel>
<chart>
<title>Disk Group ServiceTime/ms - $timeSpan$ interval</title>
<search>
<query>index=$index$ sourcetype=iostat host="$host$" $device$ | timechart $timeSpan$ avg(avgSvcMillis) by host</query>
</search>
<option name="charting.axisLabelsX.majorLabelStyle.overflowMode">ellipsisNone</option>
<option name="charting.axisLabelsX.majorLabelStyle.rotation">0</option>
<option name="charting.axisTitleX.visibility">collapsed</option>
<option name="charting.axisTitleY.visibility">visible</option>
<option name="charting.axisTitleY2.visibility">visible</option>
<option name="charting.axisX.scale">linear</option>
<option name="charting.axisY.scale">linear</option>
<option name="charting.axisY2.enabled">0</option>
<option name="charting.axisY2.scale">inherit</option>
<option name="charting.chart">bar</option>
<option name="charting.chart.bubbleMaximumSize">50</option>
<option name="charting.chart.bubbleMinimumSize">10</option>
<option name="charting.chart.bubbleSizeBy">area</option>
<option name="charting.chart.nullValueMode">connect</option>
<option name="charting.chart.showDataLabels">none</option>
<option name="charting.chart.sliceCollapsingThreshold">0.01</option>
<option name="charting.chart.stackMode">stacked</option>
<option name="charting.chart.style">shiny</option>
<option name="charting.drilldown">all</option>
<option name="charting.layout.splitSeries">0</option>
<option name="charting.layout.splitSeries.allowIndependentYRanges">0</option>
<option name="charting.legend.labelStyle.overflowMode">ellipsisEnd</option>
<option name="charting.legend.placement">bottom</option>
<option name="charting.axisTitleY.text">Milliseconds</option>
</chart>
</panel>
</row>
</form>
```

DATABASE STORAGE MONITORING EQUIPMENT

FIELD OF ART

Aspects of the disclosure generally relate to equipment, including one or more computers particularly configured and/or executing computer software, and methods for monitoring database storage. More particularly, aspects of this disclosure relate to equipment and tools that allow a user to monitor database storage at various granularities and set thresholds for generating alerts.

BACKGROUND

Databases, such as those provided by ORACLE, are used to support applications, such as applications for depositing checks, processing bank loans, and transferring funds. The applications may be executed on computers of companies, such as banks, and their customers. The databases store information needed by the applications to perform their functions. An application may send a request for information to a database. In turn, the database may request the information from a shared storage array. A service level agreement (SLA) may be in effect to control/manage the transfer of information between the database and the shared storage array. For example, the SLA may set limits/restrictions, referred to as service level objectives, on an amount/size of the information being transferred and the frequency at which transfers take place.

If SLOs are exceeded, a latency issue may arise. As latency increases, the database memory may become full and the database may become overloaded/throttled. This may also cause the application to run slower, and a user of the application may experience a frozen screen or other sign of buffering. There are tools for monitoring databases, but the tools are commonly not helpful for identifying the cause of an overloaded/throttled database. In particular, the tools do not provide storage throughput data in small enough intervals to allow troubleshooters to identify the problem and do not make it readily apparent which part of the database is causing the problem.

In light of the above, it should be understood that there may be a demand, for example, among organizations (e.g., banks), their personnel (e.g., troubleshooters and database administrators), and others (e.g., contractors) responsible for troubleshooting databases, for equipment/devices, methods, software, and systems that assist in monitoring database storage so that problems, and the parts of the database that cause them, may be readily identified.

BRIEF SUMMARY

The following presents a simplified summary of the present disclosure in order to provide a basic understanding of some aspects of the disclosure. The summary is not an extensive overview of the disclosure. It is not intended to identify key or critical elements of the disclosure or to delineate the scope of the disclosure. The following summary merely presents some concepts of the disclosure in a simplified form as a prelude to the detailed description below.

Aspects of this disclosure provide tools for quickly and accurately (e.g., at small granularities) analyzing storage area network (SAN) storage throughput performance of a database (e.g., an Oracle database hosted on, e.g., a LINUX sub-system). These tools may be used by administrators (e.g., administrators of a bank's back end computing systems) for the purposes of troubleshooting and monitoring storage related issues, capacity planning, and technical and performance testing.

Aspects of the disclosure relate to methods, computer-readable media, systems and apparatuses for monitoring database storage, including identifying whether the size or frequency of storage throughput data for a database exceeds SLOs imposed on the database. For example, aspects include methods, computer programs, systems, and apparatuses for providing a Database Storage Throughput Analyzer (DSTA) tool that generates a query that may be executed to output a graph (e.g., bar graph) to a database administrator/troubleshooter so that database issues and the parts of the database causing those issues may be more readily identified. Aspects of the disclosure allow storage throughput data to be evaluated at different levels of granularity (e.g., at 30 second or one minute intervals). Aspects of the disclosure also provide a portal for users (e.g., administrators and troubleshooters) to work individually or together to analyze the database storage throughput data. Aspects also include the creation and sending of alerts to specific user when SLOs are exceeded.

In some aspects, a system may include a client device configured to execute an application; a database configured to support the client device in executing the application, the database comprising a plurality of database clusters, each database cluster comprising at least one host device; a storage array configured to provide information to the database, the storage array comprising a plurality of storage devices storing the information; and a computing device comprising a hardware processor. The hardware processor may cause the computing device to execute a Database Storage Throughput Analyzer (DSTA) tool; specify (using the Database Storage Throughput Analyzer (DSTA) tool) a service level objective; generate (based on the service level objective) a query; receive (from a system hosting the database) storage throughput measurements for the database; and apply the query to the storage throughput measurements.

Further, in some aspects, a non-transitory computer-readable storage medium may store computer-executable instructions that, when executed by a hardware processor, may cause the computing device to specify a service level objective (e.g., indicating that a size of storage throughput should not exceed 600 MB/s) for controlling communications between a database and a storage array. This database may be configured to support a client device in executing an application and may include a plurality of database clusters, or a plurality of automatic storage management (ASM) groups, that each comprise at least one host device or device manager. Meanwhile, the storage array may be a shared storage array and may be configured to provide information to the database and other databases. The storage array may include a plurality of storage devices, or volumes, that store the information (e.g., a bank's customer information). The computer-executable instructions, when executed, may further cause the computing device to generate (based on the service level objective) a query; receive (from a system hosting the database) storage throughput measurements (e.g., i/o measurements) for the database; and apply the query to the storage throughput measurements.

Additionally, in some aspects, a method may include specifying, by a computing device, a service level objective for controlling communications between a database and a storage array. This database may be configured to support a client device in executing an application and may include a plurality of database clusters, or a plurality of ASM groups, that each comprise at least one host device or device manager. Meanwhile, the storage array may be a shared storage array and may be configured to provide information to the database and other databases. The storage array may include a plurality of storage devices, or volumes, that store the information (e.g., a bank's customer information). The method may further include generating, by the computing device and based on the service level objective, a query; receiving, from a system hosting the database, storage throughput measurements for the database; and applying the query to the storage throughput measurements. Any of the steps of this method may be performed by any of the computing devices disclosed herein.

From these systems, methods, computer-readable media, and apparatuses a number of advantages may be realized. For example, the tools disclosed herein may allow for analysis and monitoring of storage throughput for a cluster of nodes together and for each individual node in the cluster. Also, the tools may allow for analysis and monitoring of storage throughput at an automatic storage management group level or at a device manager level. The tools may improve the accuracy of the analysis and monitoring of the storage throughput by increasing the number of data samplings, such the intervals at which the throughput data may be analyzed may be at least one minute intervals. The tools may provide the ability to individually measure and analyze storage performance indicators, such as the frequency (e.g., input/output operations per second (iop/s)) and size (e.g., megabytes per second (MB/s)) of throughput. Other storage performance indicators that may be measured and analyzed by the tools disclosed herein include the amount of "read" and "write" throughput. The tools may also compare the amount of read throughput against the amount of write throughput. The tools may also perform other comparisons to identify if throughput exceeds a predefined service level objective (SLO).

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present disclosure is illustrated by way of example and not limited in the accompanying figures in which like reference numerals indicate similar elements and in which:

FIG. 7 illustrates an example of a portion of a query according to one or more aspects described herein.

FIGS. 8A-C illustrate an example method according to one or more aspects described herein and example outputs resulting from such method.

FIGS. 9A-C illustrate an example method according to one or more aspects described herein and example outputs resulting from such method.

FIGS. 10A-H illustrate an example of a portion of a query according to one or more aspects described herein.

DETAILED DESCRIPTION

Figure 1:
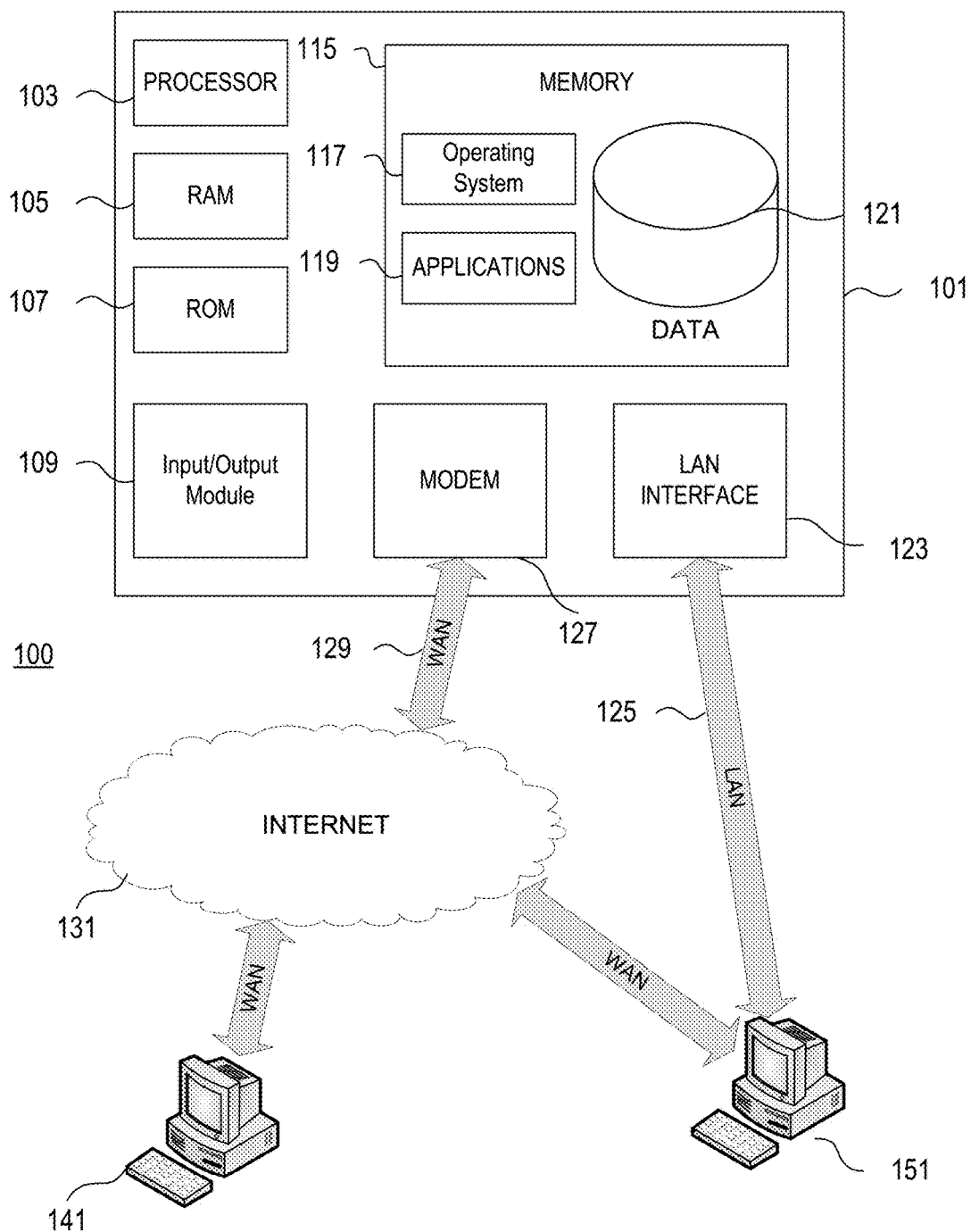
FIG. 1 is an illustrative block diagram of an example computing device that may be used according to an illustrative embodiment of the present disclosure.

In the following description of various illustrative embodiments, reference is made to the accompanying drawings, which form a part hereof, and in which is shown, by way of illustration, various embodiments in which the disclosure may be practiced. It is to be understood that other embodiments may be utilized, and that structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As will be discussed further below, aspects described herein relate to a tool (also referred to herein as the "Database Storage Throughput Analyzer (DSTA) tool") for analyzing storage throughput of a database in communication with a storage system (e.g., storage area network). The tool may refer to the hardware (e.g., computer processor(s)) and/or software (e.g., a computer application, program, and query) that allows a user to filter throughput measurements (e.g., frequency and size) based on various intervals and display the measurements to a user in a manner that allows the user to efficiently diagnose a problem. The DSTA tool may provide analysis at both device manager (DM) and disk group (or ASM group) levels. Analysts, engineers, administrators, and others may use the Database Storage Throughput Analyzer (DSTA) tool to analyze a database or database cluster's throughput to a network storage device. In some embodiments, the Database Storage Throughput Analyzer (DSTA) tool may leverage SPLUNK's dashboard features to dynamically query, calculate, and display database storage throughput data in graphical format (e.g., bar graph format) based on a variety of end user selected parameters (e.g., host, time, date, frequency). Further, the Database Storage Throughput Analyzer (DSTA) tool's output may interface with (or be integrated into) SPLUNK's monitoring and alerting capabilities using key storage performance indicators (e.g., size and frequency service level objectives, AWAIT time, and service time). Thus, the Database Storage Throughput Analyzer (DSTA) tool may provide an end user with a proactive warning and analysis of excessive database storage throughput. The Database Storage Throughput Analyzer (DSTA) tool may support the following database/network storage configuration:

Operating System: LINUX
Storage Framework: Multipathing
Database: ORACLE
Database Storage Manager: ASM
Network Storage: SAN In some organizations (e.g., businesses), a storage system operates without service level agreements (SLAs). In such systems, there may be fewer problems with latency. In other systems, SLAs may be put in place for a storage system to work properly. In some cases, implementing an SLA may lead to latency. In particular, an SLA may specify one or more service level objectives (SLO) that should not be exceeded. An SLO may define a limit for storage throughput (e.g., a frequency limit or storage size limit). When an SLO is exceeded, it may be difficult to determine why because SLOs may be exceeded for various reasons (e.g., system failure (mechanical or software issue), system overload). In this scenario, certain system administrators may be called on to determine why an SLO was exceeded in a particular instance. The Database Storage Throughput Analyzer (DSTA) tool disclosed herein may be used by these administrators to answer this question accurately. For example, the Database Storage Throughput Analyzer (DSTA) tool disclosed herein may allow these administrators to analyze the throughput measurements at a small enough interval (e.g., within a minute) such that the administrators can pinpoint the problem.

In other words, if storage throughput data is only output in five (5) minute intervals, administrators may miss where an SLO was exceeded because the data over the five minute interval might average out to be below the SLO. For instance, if the throughput was low for the first and last two minutes of a five minute interval but spiked during the middle minute of the five minute interval, the administrator might miss the spike and thus miss the point at which the SLO was exceeded. Using the Database Storage Throughput Analyzer (DSTA) tool, this spike might not be missed because the throughput data for one minute intervals might be output. Thus, the administrators may be able to identify the precise minute in which the spike that exceeded the SLO occurred.

Even if the administrator catches the point in time when the SLO was exceeded, the throughput data might not be organized so that the administrator can determine what part of the database is causing the problem. Because the requests that may cause the SLO to be exceeded may come from different parts of the database, simply looking at the throughput data might not enable an administrator to pinpoint which part of the database was making the request that led to the SLO being exceeded. The Database Storage Throughput Analyzer (DSTA) tool disclosed herein might organize the throughput data according to different parts of the database (e.g., cluster or ASM group). Thus, the Database Storage Throughput Analyzer (DSTA) tool may indicate to the administrator which part of the database is causing the SLO to be exceeded.

The Database Storage Throughput Analyzer (DSTA) tool may be technology and/or platform agnostic, so that it may be used to evaluate storage throughput data for any database available now and in the past and similar databases that may become available in the future. The Database Storage Throughput Analyzer (DSTA) tool may receive the storage throughput data in various formats as well and may normalize the data for its use.

In some embodiments, the Database Storage Throughput Analyzer (DSTA) tool may input an interval (e.g., one minute) by which the throughput data is segmented. The tool may also input information indicating which part of the database is to be evaluated. Further, in some instances, the tool may input (e.g., from a user) or retrieve (e.g., from a SLA stored in memory) SLOs for comparison against the throughput data.

Using information specifying the interval and which part of the database is to be evaluated, the tool may generate a query. Creating a query may include compiling a report into a file, e.g., a comma separated values file (.csv file). The file may be created using the Database Storage Throughput Analyzer (DSTA) tool, another proprietary application, or an off the shelf application (e.g., MICROSOFT EXCEL OR MICROSOFT ACCESS).

The Database Storage Throughput Analyzer (DSTA) tool may input storage throughput data for a database from the system (e.g., LINUX) hosting the database. The inputted data may be in the form of a log including all throughput data for the database or all throughput data for the system hosting the database. Alternatively, the inputted data may be only the data for the part of the database that is to be analyzed.

After the throughput data is inputted, it may be processed by the Database Storage Throughput Analyzer (DSTA) tool. The Database Storage Throughput Analyzer (DSTA) tool may execute code that runs the query on the storage throughput data. Execution of the code may cause the Database Storage Throughput Analyzer (DSTA) tool to parse the storage throughput data and organize the data into one or more matrices or tables. Each matrix or table may represent the throughput data for a particular part of the database.

In some instances, the processing may include outputting graphs, such as bar graphs. As an example, each bar/line may represent a characteristic (e.g., frequency or size) of the storage throughput data for a particular interval (e.g., one minute), which may have been designated by an administrator or set by default. In some instances, each bar in the graph may be broken up into different color portions indicating different types of data (e.g., transaction data, archive data) exchanged between the database and a storage array or storage group in a storage area network (SAN). Also, in some instances, the graph may be interactive such that a value for a characteristic of the storage throughput data is displayed in response to moving a cursor or other pointer over a line in the graph. For example, placing a cursor over a first line in the graph might display that the amount of throughput data for a first time was 600 MB/s, whereas placing the cursor over a second line in the graph might display that the amount of throughput data for a second time was 250 MB/s.

Although bar graphs are described, other types of graphs (e.g., pie chart) may be used as well. In some cases, a dashboard with multiple graphs may be displayed. The dashboard may include options for designating various settings (e.g., color, resolution) of the graphs.

Further, in some examples, the Database Storage Throughput Analyzer (DSTA) tool may automatically determine, based on the storage throughput data, whether an SLO was exceeded. If so, the Database Storage Throughput Analyzer (DSTA) tool may indicate a violation by coloring or otherwise marking the data showing the violation. In addition, if a violation of an SLO occurred, the Database Storage Throughput Analyzer (DSTA) tool may output an alert. The alert may include details (e.g., the amount by which the SLO was exceeded) regarding the violation.

These and additional examples and arrangements will be discussed more fully below.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include a computing device 101. In one or more embodiments, teachings of the present disclosure may be implemented with a computing device 101. The computing device 101 may have a processor 103 for controlling overall operation of computing device 101 and its associated components, including random-access memory (RAM) 105, read-only memory (ROM) 107, communications module 109, and memory 115. Computing device 101 may include a variety of computer readable media. The computer readable media may be any available media that may be accessed by computing device 101, may be non-transitory, and may include volatile and nonvolatile media. It also may include removable and/or non-removable media. The computer readable media may store any information, such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor 103 to perform steps of a method in accordance with aspects of the disclosed arrangements is disclosed. For example, aspects of the method steps disclosed herein may be executed on a processor 103 of computing device 101. Such a processor 103 may execute computer-executable instructions stored on a computer-readable medium.

Software may be stored within memory 115 and/or other storage to provide instructions to processor 103 for enabling computing device 101 to perform various functions. For example, memory 115 may store software used by the computing device 101, such as an operating system 117 and application programs 119, and may include an associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a display device for providing textual, audiovisual and/or graphical output.

Computing device 101 may operate in a networked environment supporting connections to one or more remote computing devices, such as computing devices 141 and 151. Computing devices 141 and 151 may be personal computing devices or servers that include any or all of the elements described above relative to computing device 101. In some embodiments, computing devices 141 or 151 may be a mobile device (e.g., smart phone) communicating over a wireless carrier channel. Also, in some embodiments, the computing device 101 may be connected to the computing devices 141 or 151 to form a "cloud" computing environment.

The computing device 101 may include a local area network (LAN) interface 123 for communicating via a LAN connection 125 (which may be a wireless LAN (WLAN) connection, such as a Wi-Fi connection). The computing device 101 may also include a wide area network (WAN) interface 127, such as a modem, for communicating via a WAN connection 129, as well as other interfaces for communicating over other networks. In some embodiments, the WAN connection 129 may be used to communicate with other computing devices via a WAN 131, such as the Internet. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations, including distributed computing environments. Further, the computing device 101 may be similar to any of a variety of specially configured computing devices, such as a personal computer (e.g., a desktop computer), server, laptop computer, notebook, tablet, smartphone, consumer electronics, minicomputers, mainframe computers, etc. Also, the computing device 101 may have a Database Storage Throughput Analyzer (DSTA) tool for performing methods and/or executing computer-executable instructions to monitor a database and analyze storage throughput data. The Database Storage Throughput Analyzer (DSTA) tool may be implemented with one or more processors (which may be specially configured or may be a general processor 103) and one or more storage units (e.g., databases, RAM, ROM, and other computer-readable media), one or more application specific integrated circuits (ASICs), and/or other hardware components. In cases where one or more processors are used to implement the Database Storage Throughput Analyzer (DSTA) tool, the one or more processors may be specially configured processors in addition to or in place of one or more general processors 103 or may be general processors 103 configured to execute a particular application or program.

The computing device 101 of FIG. 1 illustrates an example configuration. In some embodiments, the computing device 101 may include fewer or more elements. For example, the computing device 101 may be a mobile device (e.g., a smartphone, tablet, etc.), and thus, may also include various other components, such as a battery, speaker, and/or antennas (not shown).

Figure 2:
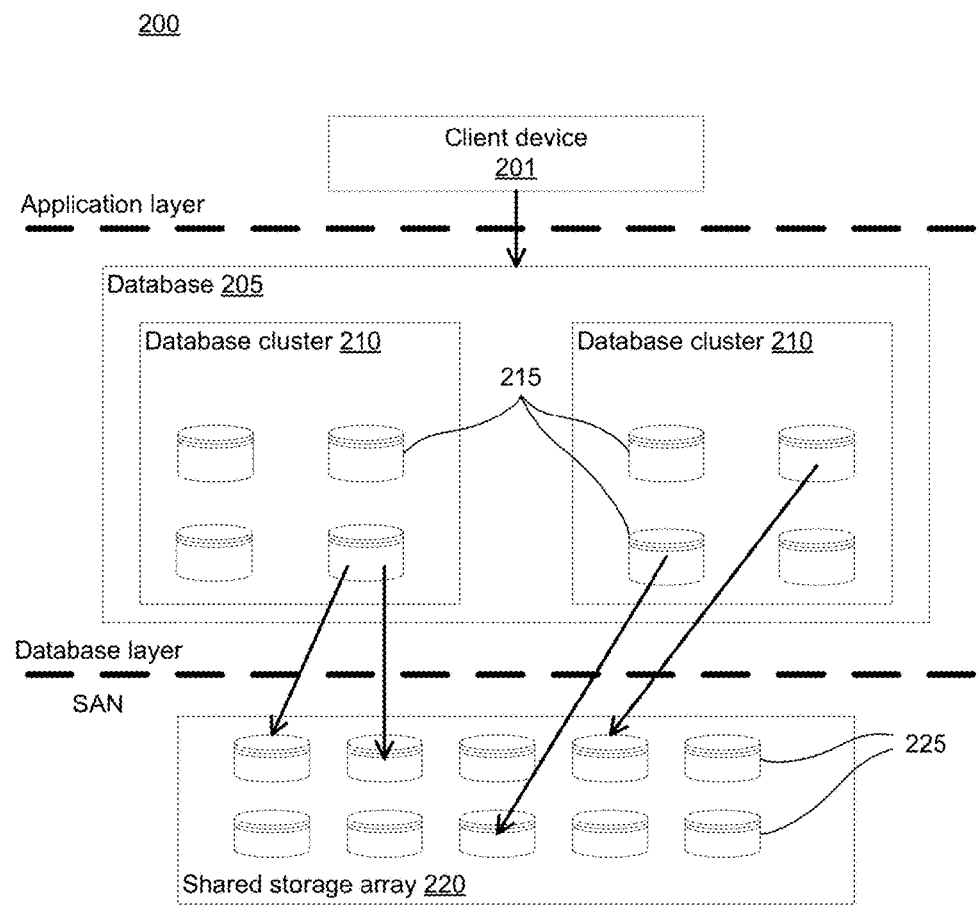
FIG. 2 is a diagram illustrating an example environment in accordance with aspects of the present disclosure.

The methods, software, computing devices, apparatuses, and systems for monitoring a database and analyzing storage throughput data of the database may be used in various environments. FIG. 2 illustrates an example architecture 200 of a system in which the Database Storage Throughput Analyzer (DSTA) tool may be utilized. The architecture 200 may include a client device 201 executing an application. The client device 201 may have a similar structure as the computing device 101. The application may be any type of application (or computer program) that interfaces with a database to provide a service. As an example, the application may be a computer program for processing bank check deposits, which may involve, among other things, determining limits on bank accounts. The client device 201 may be operated by an employee of an organization or business (e.g., a bank) that owns, manages, or controls the system. Alternatively, the client device 201 may be operated by a customer (e.g., a bank customer) of the organization or business that owns, manages, or controls the system.

The client device 201 may communicate with a database 205. This communication may be a two-way communication. For example, the client device 201 may send a request to the database 205 for information that it needs to provide a particular service and the database may return a response with the information requested. Taking the example above of an application for processing bank check deposits, the client device 201 may request, from the database, an account limit of an account in which a check is to be deposited. Although only one database 205 is shown in FIG. 2, if the application provides additional services, it may access other databases as well.

The database 205 may be any type of database and may include any type of computer readable media. As shown in FIG. 2, the database 205 may include multiple database clusters 210. Each database cluster 210 may include one or more host devices 215. Although each database cluster 210 is shown as having four (4) host devices 215, the database clusters 210 may have different numbers of host devices 215. For example, one database cluster 210 may have four host devices 215 while another database cluster may have two host devices 215. Also, although two database clusters 210 are shown in the database 205, the database 205 may have fewer or more database clusters 210. Moreover, the database clusters 210 may be dynamically configured. That is, the database clusters 210 may change over time to reallocate resources. For example, in one instance, a host device 215 may belong to one database cluster 210 and in another instance that same host device 215 may belong to another database cluster 210.

When a request, such as the request for the account limit described above, is received by the database 205, it may be handled by one or more host devices 215. In some examples, each host device 215 may be configured to handle any request for a particular application. In other examples, only a subset of the host devices 215 in the database 205 may be configured to handle certain requests. By arranging the host devices 215 into clusters, the database 205 reliability may be improved. For example, if one database cluster 210 is experiencing problems (e.g., mechanical/electrical failure), then another database cluster 210 may still be operational in order to handle a request.

FIG. 2 also shows that the database 205 may communicate with a shared storage array 220 in a storage area network (SAN). This communication may also be a two-way communication. Moreover, a service level agreement (SLA) may set forth service level objectives (SLOs) for the communications between the database 205 and the shared storage array 220. For example, an SLO may specify that communications between the database 205 and shared storage array 220 are supposed to be limited to 600 MB/s, 20 ms response times, and/or 20,000 iop/s.

The shared storage array 220 may include one or more storage devices 225 storing information for the application. For example, one storage device 225 might store customer (e.g., bank customer) information, such as a customer name, customer telephone number, customer address, and/or the like. Meanwhile, another storage device 225 might store bank account numbers, bank account limits, and/or other bank account information. Yet another storage device 225 might store check information, such as routing numbers and/or check numbers.

Each storage device 225 may be accessed by each host device 215. A host device may access a particular storage device 225 for particular information stored therein. The particular storage device 225 may provide the requesting host device 215, or another host device 215 in the same database cluster 210, with the requested information so that the database 205 may ultimately provide the requested information to the application executed on the client device 201.

In some examples, the storage devices 225 in the shared storage array 220 may be accessible to other databases 205 and other applications. For example, an application for processing a wire transfer may also access the storage device 225 that stores customer information. Hence, the shared storage array 220 may be shared by multiple databases for supporting multiple applications.

Figure 3:
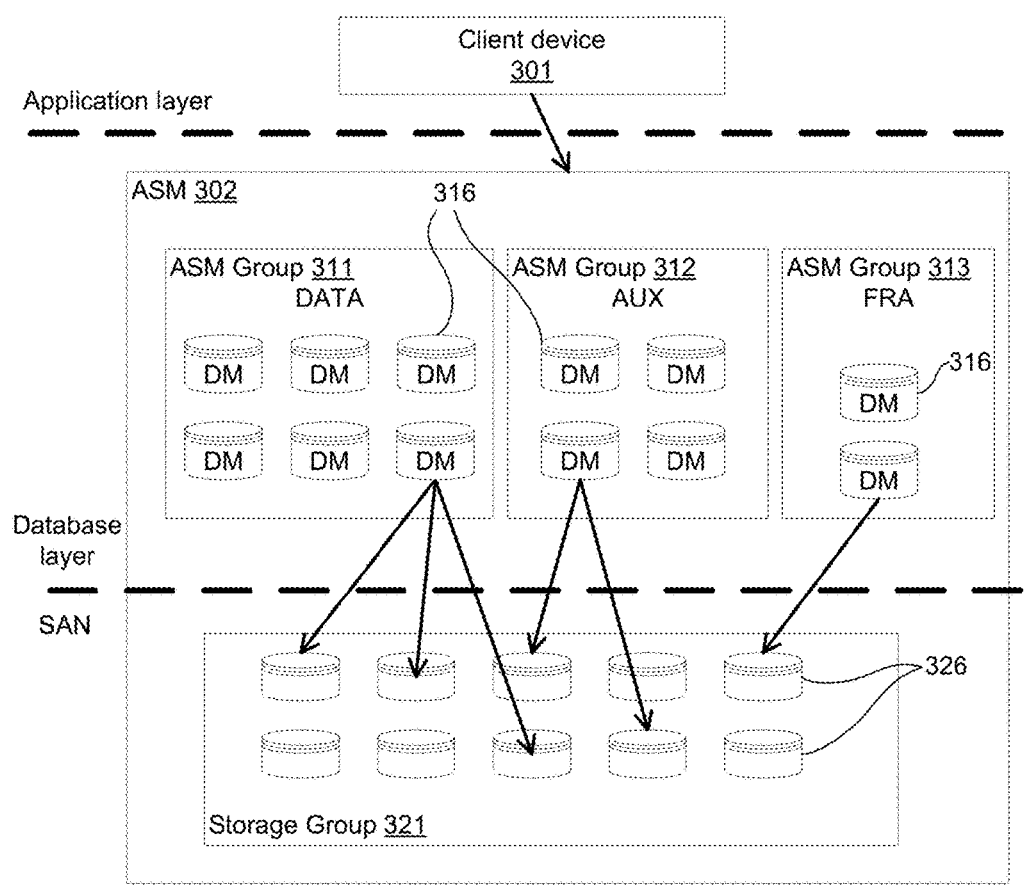
FIG. 3 is a diagram illustrating an example environment in accordance with aspects of the present disclosure.

FIG. 3 illustrates another example architecture 300 of a system in which the Database Storage Throughput Analyzer (DSTA) tool may be utilized. The architecture 300 may be based on ORACLE'S automatic storage management (ASM) architecture. The architecture 300 may include a client device 301 executing an application. The client device 301 may be similar to client device 201 and may have a similar structure as the computing device 101. The application executed by the client device 301 may be any type of application (or computer program) that interfaces with a database to provide a service.

FIG. 3 shows that the ASM 302 supports the application. The ASM 302 includes a database portion and a SAN portion. The database portion may include one or more disks or host devices 215 that may be used to implement one or more ASM groups. In the example shown in FIG. 3, the database portion includes three ASM groups. Each ASM group may be assigned a name. The name may be assigned, for example, by an administrator (e.g., system developer). In the example of FIG. 3, the first ASM group 311 is assigned the name "DATA," the second ASM group 312 is assigned the name "AUX," and the third ASM group 313 is assigned the name "FRA." Each of the ASM groups includes one or more device managers (DMs) 316, each of which may be provided by one or more disks. Each ASM group may include the same or a different number of device managers 316. Although FIG. 3 illustrates the ASM groups 311, 312, 313 including six, four, and two devices managers 316, respectively, practical implementations of the ASM groups may include hundreds of device managers 316. The high number of device managers 316 adds to the complexity of diagnosing problems (e.g., SLO violations) when they occur.

The device managers 316 may access one or more storage groups 321 of the SAN to fulfill requests received from the application. The storage group 321 may return the requested information to the device manager 316, and thus, the communication between the device managers 316 and storage group 321 may be a two-way communication. The communications may be subject to a service level agreement (SLA). The SLA may define service level objectives (SLOs) for communications between the ASM groups 311, 312, 313 and the storage group 321. In some cases, the SLOs may be the same regardless of which ASM group is communicating with the storage group 321. In some cases, the SLOs may be different for different ASM groups. For example, one SLO may specify that communications between ASM group 311 and storage group 321 are supposed to be limited to 500 MB/s, 20 ms response times, and/or 18,000 iop/s, whereas a second SLO may specify that communications between the ASM group 312 and storage group 321 are supposed to be limited to 400 MB/s, 15 ms response times, and/or 15,000 iop/s.

Further, although FIG. 3 illustrates only one storage group 321, additional storage groups may provide information to the ASM groups 311, 312, 313 for supporting the application executing on the client device 301. In some cases, the SLOs may be the same for communications with each storage group 321. However, in some cases, the SLOs may be different for different storage groups. For example, one SLO may specify that communications between ASM group 311 and a first storage group 321 are supposed to be limited to 200 MB/s, 10 ms response times, and/or 12,000 iop/s, whereas a second SLO may specify that communications between the ASM group 311 and a second storage group 321 are supposed to be limited to 250 MB/s, 8 ms response times, and/or 10,000 iop/s.

As shown in FIG. 3, the storage group 321 may include one or more volumes 326 storing information for the application. For example, one volume 326 might store customer (e.g., bank customer) information, such as a customer name, customer telephone number, customer address, and/or the like. Meanwhile, another volume 326 might store bank account numbers, bank account limits, and/or other bank account information. Yet another volume 326 might store check information, such as routing numbers and/or check numbers.

The volumes 326 may be any type of volume, such as a thin volume. In some examples, all volumes 326 in a common storage group 321 may be the same type of volume. In some examples, different types of volumes may be used within the same storage group 321. The volumes 326 may be managed by a software component that allocates memory/disk space for the volumes 326.

Each volume 326 may be accessed by each device manager 316. A device manager 316 may access a particular volume 326 for particular information stored therein. The device manager 316 may specify the particular volume 326 by indicating a logical unit number (LUN) that is unique to the volume 326 within the storage group 321. The volume 326 may then provide the requesting device manager 316, or another device manager 316 in the same ASM group, with the particular information requested so that the ASM group may ultimately provide the requested information to the application executed on the client device 301.

In some examples, the volumes 326 in the storage group 321 may be accessible to other ASM groups (not shown) for supporting other applications. For example, an application for processing a wire transfer may also access the storage group 321 that stores customer information. Hence, the storage group 321 may be shared by ASM groups in different databases for supporting multiple applications.

Figure 4:
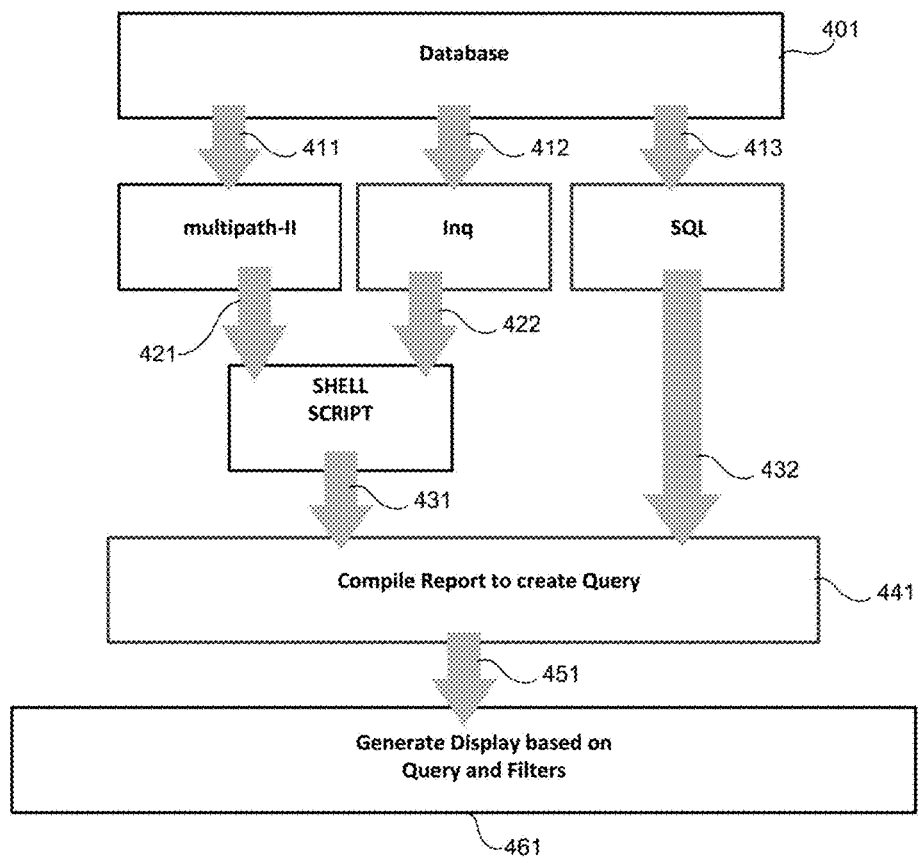
FIG. 4 is a flow diagram illustrating an example method according to one or more aspects described herein.

FIG. 4 illustrates a process for building a query in accordance with aspects of the present disclosure. One or more of the steps in the process in FIG. 4 may be performed by the Database Storage Throughput Analyzer (DSTA) tool. FIG. 4 illustrates a database 401 for which the query is developed to analyze. The process may include a step 411 of executing a command line utility (e.g., MULTIPATH II) that provides information on multipathing of one or more device managers 316 in the database 401. As a result of step 411, the utility may provide the alias(es) of one or more of the device managers 316 (e.g., a device manager number, such as DM-10 or DM-25) and/or the alias(es) of one or more ASM groups. The process may also include a step 412 of executing another command line utility (e.g., INQUIRY utility) that provides information (names, aliases, or numbers) on the volumes 326 supporting the database 401.

In addition, the process may include a step 413 of executing a script for obtaining the aliases (e.g., "asm_d001") and names (e.g., "DATA") of the ASM groups (e.g., ASM group 311) in the database 401. The script executed in step 413 may use the Structured Query Language (SQL) to pull information (e.g., the aliases of the ASM groups) from the database 401.

In step 421, a shell script is executed to process the outputs of the utilities executed in steps 411 and 412. The shell script may be written so as to match aliases of the device managers 316 with the volumes 326. The shell script may be written in any language (e.g., SQL, Bash, PERL, etc.). The output of the shell script may be a comma separated values (.csv) file, which organizes the aliases of the device managers 316 and volumes into a table format.

Both the script executed in step 421 and the script executed in step 413 may output their results (e.g., a table of device managers and volumes and a list of ASM groups) to an application, e.g., MICROSOFT EXCEL or ACCESS, at steps 431 and 432, respectively. Alternatively, the Database Storage Throughput Analyzer (DSTA) tool may comprise its own code for parsing tables (.csv files) and lists and organizing the values therein.

Figure 7:
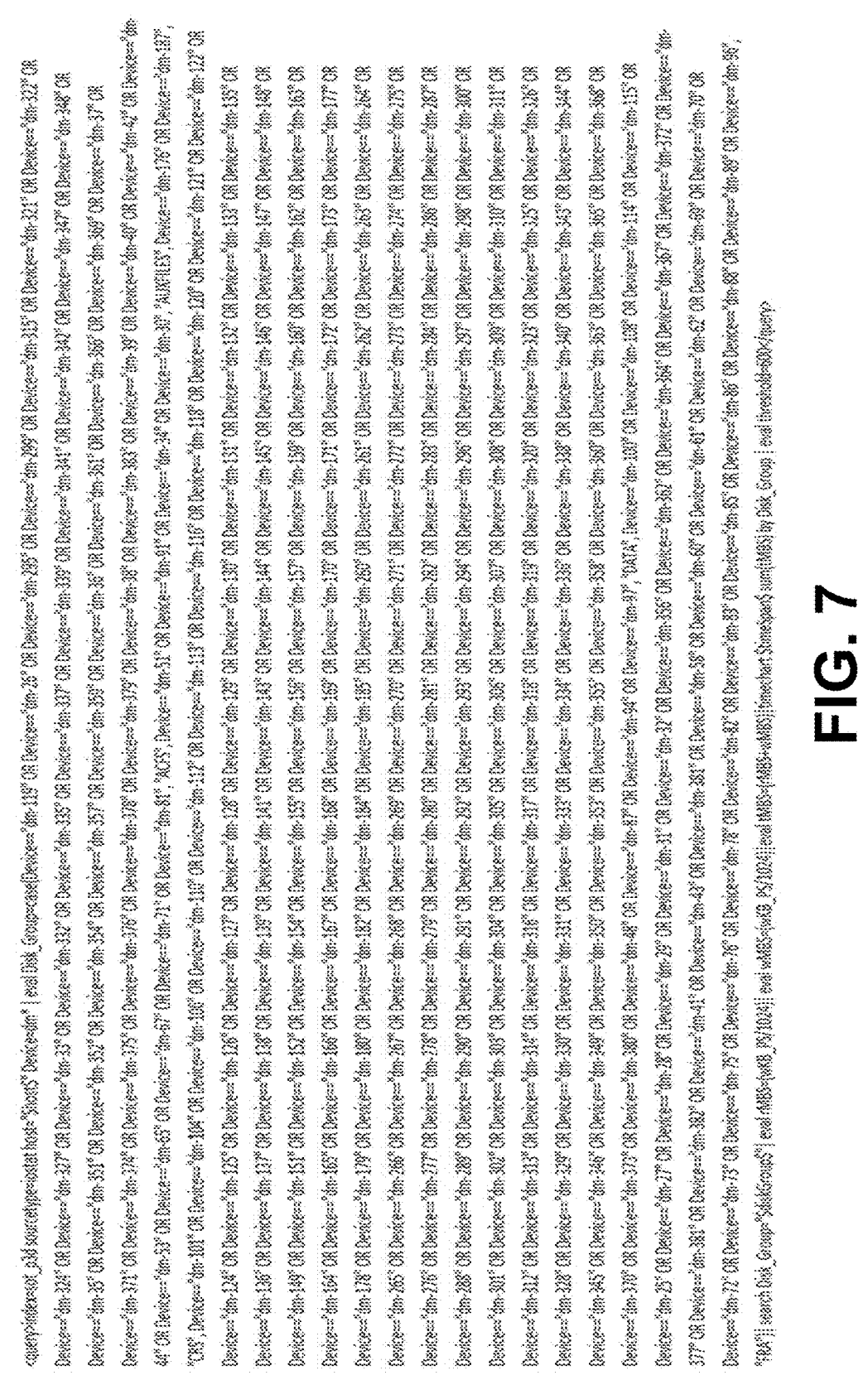

Step 441 may include compiling the outputs from the scripts executed in steps 413 and 421 to create a query. In step 441, the Database Storage Throughput Analyzer (DSTA) tool may execute an algorithm, stored in local or remote memory, for pulling values from the results of the scripts executed in steps 413 and 421 to generate a query. FIG. 7 illustrates an example of a portion of a query that may be generated from the values related to the device managers, volumes, and ASM groups. As shown, the query may be compiled from other parameters, in addition to those output from the scripts executed in steps 413 and 421, such as the "600" in the last line of the query. The value "600" may be added to the query from a user input or from an SLA. In the portion of the query of FIG. 7, the value "600" may indicate that 600 MB/s is the threshold set by an SLO for the amount of storage throughput data of a database (e.g., database 401) accessing a shared storage array 220 or storage group 321. The query may also be configured to convert the units (e.g., KB/s) of the data (e.g., i/o measurements) that it is applied to into units (e.g., MB/s) that are used in the SLOs. Further, the query may also be configured to break up this data into different portions, such as read throughput and write throughput.

In step 451, the query may be transferred to a graphical user interface generator, such as SPLUNK. SPLUNK is a computer application/program that generates graphical user interfaces based on queries. SPLUNK may also be configured to receive, from a system, e.g., LINUX, hosting a database (e.g., database 401), input/output (i/o) measurements pertaining to the database.

In some cases, step 451 may include performing copy (or cut) and paste operations. For example, a user may highlight the query generated in step 441, select to copy (e.g., by simultaneously pressing the control and "C" keys on a keyboard) or cut (e.g., by simultaneously pressing the control and "X" keys on a keyboard), place a cursor in a text box, for receiving queries, within a graphical user interface generator (e.g., SPLUNK), and select paste (e.g., by simultaneously pressing the control and "V" keys on a keyboard). In some cases, the Database Storage Throughput Analyzer (DSTA) tool may include an option for exporting the generated query to a graphical user interface generator, and step 451 may include selection of such an option. In some instances, the graphical user interface generator (e.g., SPLUNK) may have an option for inputting a query, and step 451 may include selection of such an option which causes the graphical user interface generator to retrieve the query generated in step 441.

In step 461, the graphical user interface generator (e.g., SPLUNK) may parse the i/o measurements related to the database 401. The i/o measurements may be received from, e.g., LINUX in a log that the graphical user interface generator (e.g., SPLUNK) may parse. In this step, the graphical user interface generator may also run the query received in step 451. Based on the query, the graphical user interface generator may retrieve certain i/o measurements. The graphical user interface generator may render a graphical user interface to display the i/o measurements according to the query. This may include generating, e.g., bar graphs. For example, the graphical user interface generator may generate a bar graph for a ASM group that illustrates a bar/line for every 30 seconds/minute/two minutes/five minutes within a window of time (e.g., a window corresponding to the hours of operation of a bank, such as between 8 am and 5 pm, or corresponding to the hours of operation of a particular service performed by a bank, such as between 4 pm and 11 pm). The magnitude of a bar/line in the bar graph may indicate a value of the storage throughput data (e.g., an amount of storage throughput or frequency of storage throughput) during the 30 seconds/minute/two minutes/five minutes represented by the bar/line.

In some examples, the bar graph may be displayed such that the bars/lines are arranged vertically. In some examples, the bars/lines are broken up into multiple portions and color coded. Different colors may indicate different types of storage throughput data. The length of the bar/line that the bar/line has a particular color may depend on an amount of the total value for the bar/line that is attributed to a particular type of data. For instance, if a bar/line indicates a total storage throughput size of 600 MB/s and half of the total is due to transfer of a first type of data (e.g., archive data) and the other half is due to transfer of a second type of data (e.g., transaction), then half of the line may be a first color (e.g., blue) to reflect the first type of data and the other half of the line may be a second color (e.g., green).

In some examples, the graphical user interface generator may generate multiple graphs based on multiple queries. That is, the graphical user interface generator may include multiple panels, each configured to output a graph.

The graphical user interface generator may include a dashboard with options for filtering the graphs. Thus, step 461 may include inputting user inputs for filters and filtering the graphs. As an example, step 461 may include inputting a value for adjusting a threshold for a storage throughput size (e.g., adjusting a threshold from 600 MB/s to 800 MB/s) and moving a line, representing the threshold, up or right on a graph in accordance with the adjusted value. This line may be a different color than the colors used for the different types of data forming the bars/lines representing the storage throughput data.

Figure 5:
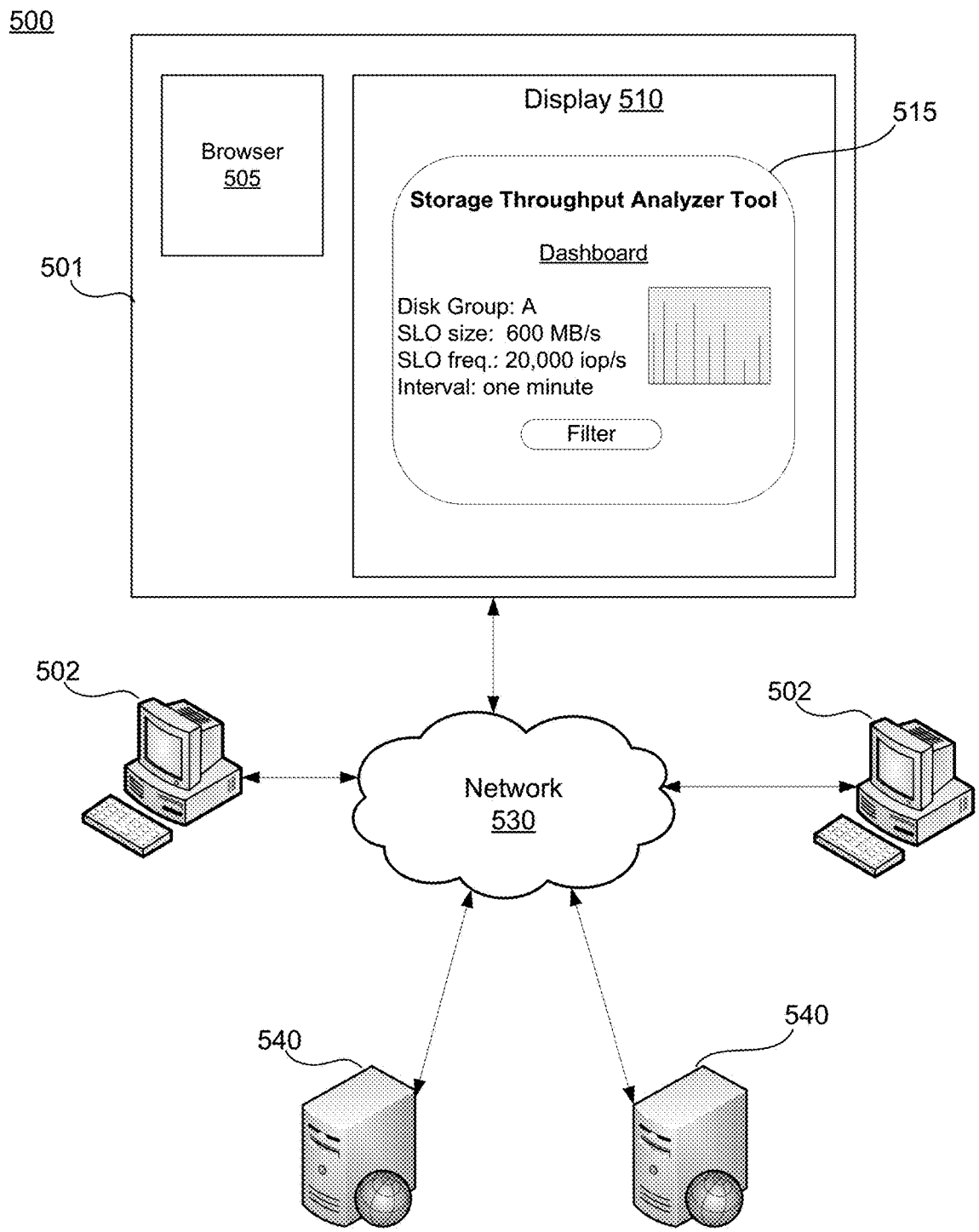
FIG. 5 is a diagram illustrating an example environment in accordance with aspects of the present disclosure.

FIG. 5 illustrates an example environment 500 in which the Database Storage Throughput Analyzer (DSTA) tool may be used. As shown in FIG. 5, the environment 500 may include a computing device 501 configured to execute or operate the Database Storage Throughput Analyzer (DSTA) tool. The computing device 501 may be configured in a similar manner as the computing device 101 of FIG. 1.

The Database Storage Throughput Analyzer (DSTA) tool disclosed herein may be useful to more than one system administrator, troubleshooter, or other personnel (e.g., contractors) responsible for troubleshooting problems with a database or the application it supports. As such, the Database Storage Throughput Analyzer (DSTA) tool may be implemented in a manner in which it may be operated by a number of users. The computing device 501 may include a browser 505 (e.g., web browser) for accessing a portal (e.g., intranet or Internet portal) providing the Database Storage Throughput Analyzer (DSTA) tool. The computing device 501 may be configured to execute any browser 505, such as INTERNET EXPLORER, SAFARI, FIREFOX, OR GOOGLE CHROME.

Referring to FIG. 5, the computing device 501 may include a display 510 for displaying an interface 515 (e.g., web page) of the Database Storage Throughput Analyzer (DSTA) tool. When executed, the Database Storage Throughput Analyzer (DSTA) tool may generate the interface 515 and cause the interface to be displayed on the display 510. Although FIG. 5 shows only one interface 515 being displayed, other computing devices 502 may also be used to access the Database Storage Throughput Analyzer (DSTA) tool. In some instances, multiple computing devices 501 and 502 may access the Database Storage Throughput Analyzer (DSTA) tool simultaneously so that multiple administrators (e.g., troubleshooters) may troubleshoot a potential storage issue together. For example, the Database Storage Throughput Analyzer (DSTA) tool may provide an interface 515 on the display 510 of the computing device 501 and a similar interface on a display of the computing device 502 so that an administrator using computing device 501 may evaluate the same data as an administrator using computing device 502.

In some embodiments, the Database Storage Throughput Analyzer (DSTA) tool may be located at one or more backend system servers 540 remote from the computing devices 501, 502. Any of the computing devices 501, 502 may access the backend system servers 540 through a network 530, which may include any network, such as the Internet or a private network (e.g., a virtual private network). The one or more backend system servers 540 may each include a portal for providing the interface 515 through which storage throughput data may be monitored. In some embodiments, the backend system servers 540 may execute the Database Storage Throughput Analyzer (DSTA) tool and may send alerts (e.g., if an SLO was exceeded) via the network 530 to one or more administrators/troubleshooters using the computing devices 501, 502. In some instances, an alert may be sent to one of the computing devices 502 but not to the other computing devices 501, 502.

Further, in some embodiments, a username and/or password may be required before a user of the computing device 501 may view the interface 515 through the portal. In other words, security measures may be taken to restrict or limit access to the Database Storage Throughput Analyzer (DSTA) tool to certain individuals or computing devices 501, 502 (e.g., computing devices of personnel responsible for managing and troubleshooting a database).

The backend system servers 540 may be configured to collect i/o measurements from the system, e.g., LINUX system, hosting a database. The backend system servers 540 may be configured to collect the storage throughput data continuously in real-time. Further, the backend system servers 540 may facilitate a "cloud" computing environment in which multiple users may view, interact, and/or edit the graphs displayed by Database Storage Throughput Analyzer (DSTA) tool. For example, the backend system server 540 may allow a user of computing device 501 and another user of computing device 502 to simultaneously view the interface 515. Accordingly, multiple users may be able to discuss and evaluate the same graphs based on the same i/o measurements to troubleshoot a storage issue together even if the users are remote from one another. The ability to utilize the Database Storage Throughput Analyzer (DSTA) tool in a cloud computing environment may be particularly advantageous where one administrator is more familiar with one ASM group and another administrator is more familiar with another ASM group.

Figure 6:
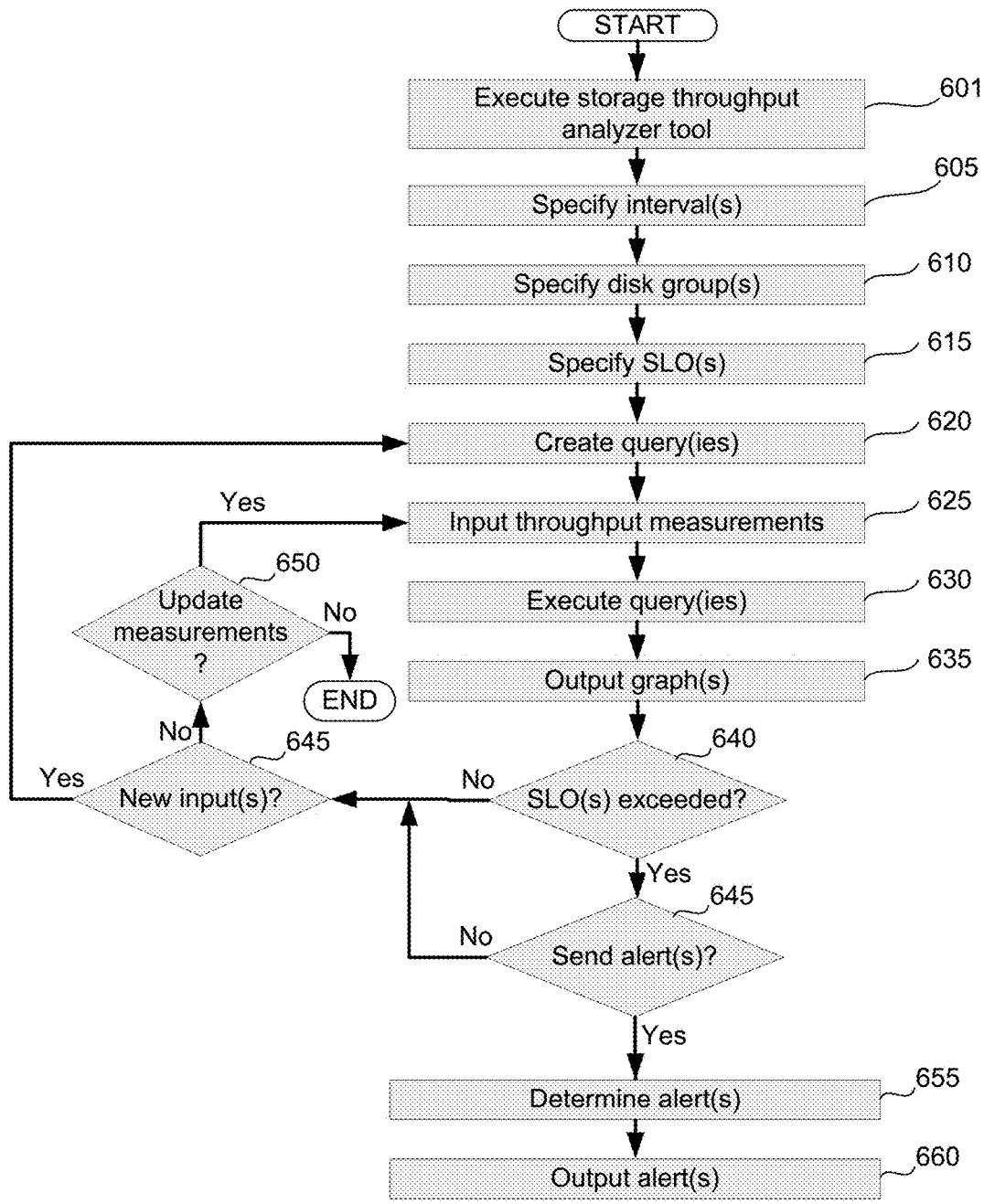
FIG. 6 is a flow diagram illustrating an example method according to one or more aspects described herein.

FIG. 6 illustrates a flow diagram for an example process in accordance with aspects of the present disclosure. More specifically, FIG. 6 illustrates a plurality of steps of a method for analyzing storage throughput data and sending alerts when SLOs are violated (e.g., exceeded). The steps of FIG. 6 may be performed by any of the various devices disclosed herein, such as a computing device 501 executing or accessing the Database Storage Throughput Analyzer (DSTA) tool or a backend system server 540 providing the Database Storage Throughput Analyzer (DSTA) tool via a portal (e.g., a web portal). One or more of the steps of FIG. 6 may be performed by executing the Database Storage Throughput Analyzer (DSTA) tool and/or using a particularly configured computing device operating as the Database Storage Throughput Analyzer (DSTA) tool. As a result of the method of FIG. 6, storage throughput data for a database may be presented to, and alerts may be sent to, administrators/troubleshooters to facilitate detection of issues (e.g., latency) associated with the database. In some circumstances, the administrator/troubleshooter may then adjust an SLO to address the issue.

The method of FIG. 6 may begin with a step 601 of executing the Database Storage Throughput Analyzer (DSTA) tool. The Database Storage Throughput Analyzer (DSTA) tool may be executed on a computing device 501 or backend system server 540. Execution of the Database Storage Throughput Analyzer (DSTA) tool may be triggered by a user (e.g., an administrator or troubleshooter). Alternatively, execution of the Database Storage Throughput Analyzer (DSTA) tool may be triggered automatically based on a clock/timer such that the tool is run at a certain time each day or each business day (e.g., at 6 pm or after close of business). Or, the Database Storage Throughput Analyzer (DSTA) tool may be run in response to some other event (e.g., the opening or closing of an application that is supported by a database that the Database Storage Throughput Analyzer (DSTA) tool is analyzing).

Step 605 may include specifying one or more intervals. In step 605, a user may input an interval (e.g., 30 seconds, one minute, two minutes) at which the storage throughput data is to be evaluated. A host system, e.g., LINUX, may take i/o measurements at very small intervals of time (e.g., every millisecond, every half-second, every second). The i/o measurements may be aggregated for the interval of time input at step 605. For example, if i/o measurements are taken every second and a one minute interval is specified at step 605, then 60 i/o measurements would be aggregated to provide the storage throughput data (e.g., 500 MB) for each one minute interval. So, if a period of time of, e.g., 1 hour is to be evaluated, there would be 60 values—one for each minute—of storage throughput data. Alternatively, step 605 may include inputting the interval from memory. In some examples, default values may be set up in advance of execution of the Database Storage Throughput Analyzer (DSTA) tool. In such cases, step 605 may include inputting the interval from a list of default settings. Step 605 may also include first inputting the interval from a list of default settings and then inputting a user input to change the default interval.

Step 610 may include specifying one or more ASM groups or database clusters. In step 610, a user may input the name or other alias of an ASM group or database cluster that is to be evaluated. Alternatively, step 610 may include inputting the name or other alias of an ASM group or database cluster from memory. In some examples, a list of default settings may specify a default ASM group or database cluster. In such examples, step 610 may include inputting the ASM group or database cluster name/alias from the default settings. Step 610 may also include first inputting the ASM group or database cluster name/alias from default settings and then inputting a user input to change the default ASM group or default database cluster.

Step 615 may include specifying one or more SLOs. In step 610, a user may input the values according to the SLOs defined in an SLA. For example, a user may specify a value of "900" for setting a SLO for the size of storage throughput to "900 MB/s." As another example, the user may specify a value of "20,000" for setting a SLO for the frequency of storage throughput to "20,000 iop/s." Alternatively, step 615 may include inputting values for one or more SLOs from a SLA stored in memory. Step 615 may also include first inputting one or more SLOs stored in memory and then inputting a user input to change one or more of the SLOs.

Step 620 may include creating/generating one or more queries from the information specified in steps 605, 610, and 615. A query may be created by running a script to set values for variables that may be read/interpreted by a graphical user interface generator to render a graphical user interface. For example, the script may create a portion of a query by setting a parameter for a threshold to a value set in step 615. More specifically, with reference to the portion of the query in FIG. 7, the script may set the "eval threshold" variable to "600" if "600" was specified in step 615. The script may also create another portion of the query by populating an array type of variable with names/aliases of device managers that belong to the ASM group specified in step 610.

Step 625 may include inputting storage throughput measurements (e.g., size and/or frequency of storage throughput data) for a database. The storage throughput measurements may be input from a system, e.g., LINUX, that hosts the database. The storage throughput measurements may be inputted into the Database Storage Throughput Analyzer (DSTA) tool, or another application such as SPLUNK, that is configured to parse the storage throughput measurements. Although FIG. 6 illustrates that step 625 occurs between steps 620 and 625, it is understood that the Database Storage Throughput Analyzer (DSTA) tool or other application (e.g., SPLUNK) may input the storage throughput measurements continuously (or at very small intervals) before, throughout, and after the process shown in FIG. 6.

Step 630 may include executing the one or more queries that were generated/created in step 620. A query may be executed by running a function designed to parse and interpret the query. The query may be executed by the Database Storage Throughput Analyzer (DSTA) tool. In some cases, the Database Storage Throughput Analyzer (DSTA) tool may be a standalone tool that creates and executes the query(ies). In other cases, the Database Storage Throughput Analyzer (DSTA) tool may include a component (e.g., software module/macro/script/add-on) of a third party computer program/application, e.g., SPLUNK, that is able to execute the query(ies). Still, in some cases, a third party computer program/application, e.g., SPLUNK, may be separate from the Database Storage Throughput Analyzer (DSTA) tool, and thus, the query may be transferred from the Database Storage Throughput Analyzer (DSTA) tool to the third party computer program/application before it is executed.

Step 635 may include outputting one or more graph(s) according to the one or more queries. If the Database Storage Throughput Analyzer (DSTA) tool executes a query, then it may output a graph. In some cases, a graph may be output by a third party computer program/application, e.g., SPLUNK, that executes a query.

In some cases, the graph may include a bar graph. The bars may be arranged vertically (e.g., to extend in the Y direction). The x-axis may represent different points in time and the y-axis may represent a magnitude in, e.g., size of the storage throughput data for a certain interval of time. In some examples, a first bar graph may show the size of the storage throughput data in certain intervals of time and a second bar graph may show the frequency of the storage throughput data for those same intervals of time.

Step 640 may include determining whether any SLOs were exceeded or otherwise violated. In step 640, the Database Storage Throughput Analyzer (DSTA) tool or a third party computer program/application (e.g., SPLUNK) may determine whether any SLO has been violated. For example, the Database Storage Throughput Analyzer (DSTA) tool or a third party computer program/application (e.g., SPLUNK) may determine that an SLO has been violated (Yes at step 640), if a bar in a bar graph extends beyond a size threshold of 900 MB/s.

If no SLOs have been exceeded/violated (No at step 640), step 645 may be performed. Step 645 may include determining whether any new input has been received/entered. For example, in step 645, the Database Storage Throughput Analyzer (DSTA) tool or a third party computer program/application (e.g., SPLUNK) may determine that a user has specified a different interval than the one specified in step 605, and therefore, may determine that a new input has been received/entered (Yes at step 645). If a new ASM group or SLO has been entered, the Database Storage Throughput Analyzer (DSTA) tool or a third party computer program/application (e.g., SPLUNK) might also determine that a new input has been received/entered (Yes at step 645).

If the Database Storage Throughput Analyzer (DSTA) tool or a third party computer program/application (e.g., SPLUNK) determines that a new input has been received, the process may return to step 620 to re-generate one or more queries based on the new input. However, if the Database Storage Throughput Analyzer (DSTA) tool or a third party computer program/application (e.g., SPLUNK) determines that a new input has been received, step 650 may be performed.

Step 650 may include determining whether updated throughput measurements have been received or should be obtained. In some examples, updated measurements may be received by the Database Storage Throughput Analyzer (DSTA) tool or a third party computer program/application (e.g., SPLUNK) periodically (e.g., every hour or every day at a certain time). Alternatively, a user input may be received that causes the Database Storage Throughput Analyzer (DSTA) tool or a third party computer program/application (e.g., SPLUNK) to request updated throughput measurements. In such case, step 650 may include detecting such a user input.

If the Database Storage Throughput Analyzer (DSTA) tool or a third party computer program/application (e.g., SPLUNK) determines that no updated measurements have been or are to be received (No at step 650), the process may (1) end, (2) return to step 645 to determine if new user inputs have been received that would cause a query to be revised or recreated, or (3) repeat step 650 to determine whether new measurements have been received. However, if the Database Storage Throughput Analyzer (DSTA) tool or a third party computer program/application (e.g., SPLUNK) determines that updated throughput measurements have been received or are to be obtained, the process returns to step 625 so that such measurements are input into the Database Storage Throughput Analyzer (DSTA) tool or a third party computer program/application (e.g., SPLUNK) and one or more queries may be executed using the updated measurements.

Returning to step 640, if an SLO is exceeded/violated (Yes at step 640), step 645 may be performed. Step 645 may include determining whether to send an alert. In some examples, the Database Storage Throughput Analyzer (DSTA) tool or a third party computer program/application (e.g., SPLUNK) may be configured to send alerts when a threshold for an SLO is exceeded. A user may enter settings into the Database Storage Throughput Analyzer (DSTA) tool or a third party computer program/application (e.g., SPLUNK) to turn on alerts. If alerts are turned on or set up (Yes at step 645), the process may proceed to step 665.

Step 665 may include determining which alert(s) to send and destination(s) for the alert(s). Step 665 may also include determining the content (e.g., message) of the alert. These determinations may be made by the Database Storage Throughput Analyzer (DSTA) tool or a third party computer program/application (e.g., SPLUNK). In some examples, the settings may indicate when a person (e.g., administrator/troubleshooter) or computing device (e.g., computing device 502) is to be alerted and which person or computing device is to be alerted. For example, the settings may indicate that a first administrator is to be alerted when the storage throughput size for a first ASM group exceeds an SLO and that a second administrator is to be alerted when the storage throughput size for a second ASM group exceeds an SLO. Additionally, or alternatively, the amount by which the SLO is exceeded may determine who or which computing device is alerted.

Step 660 may include outputting the alert(s). The Database Storage Throughput Analyzer (DSTA) tool or a third party computer program/application (e.g., SPLUNK) may output the alert(s) by sending a text message, email, or push notification to an application designed to receive alerts and display or otherwise present them to users (e.g., administrators or troubleshooters).

Figure 8A:
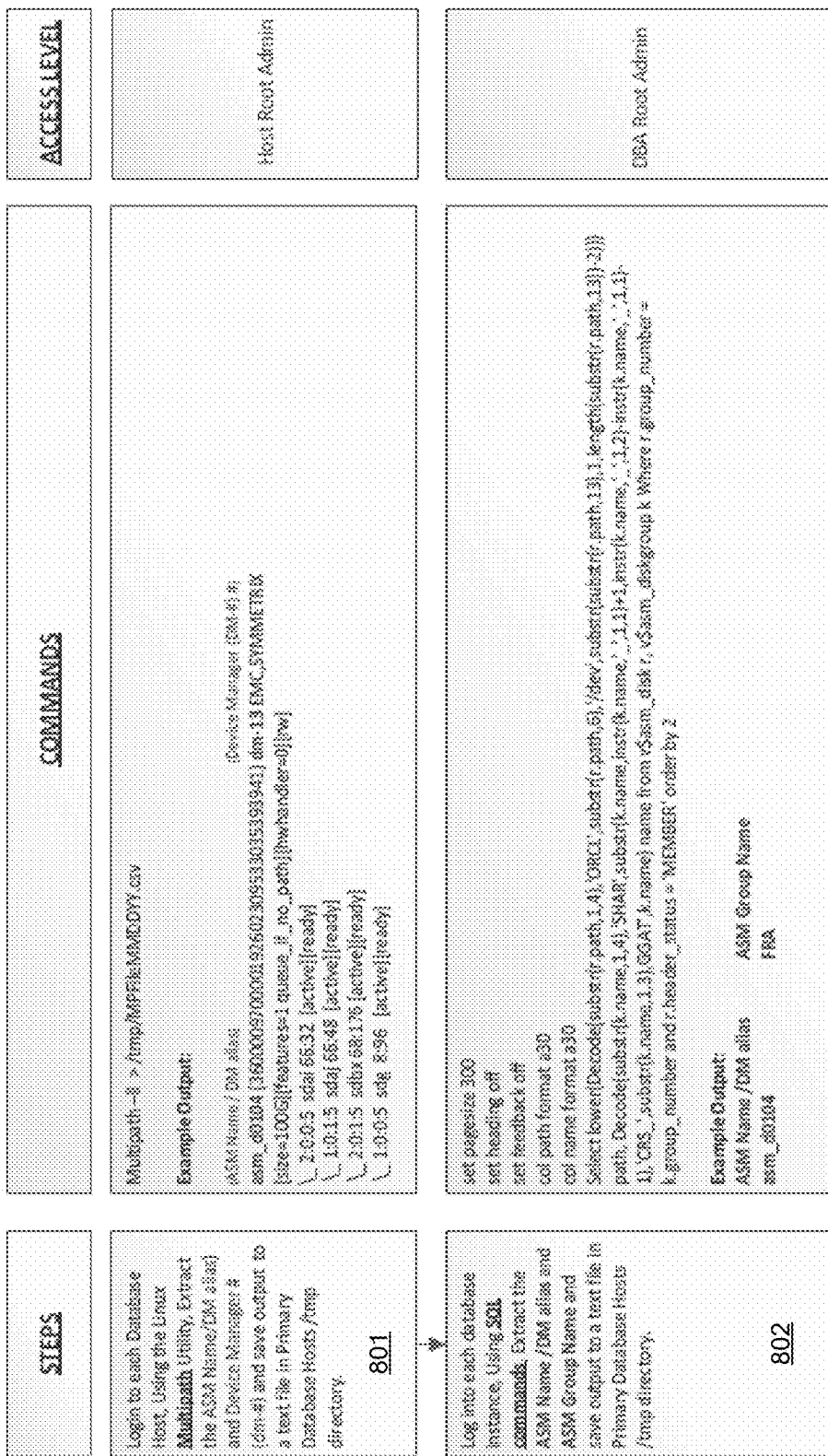
Figure 8B:
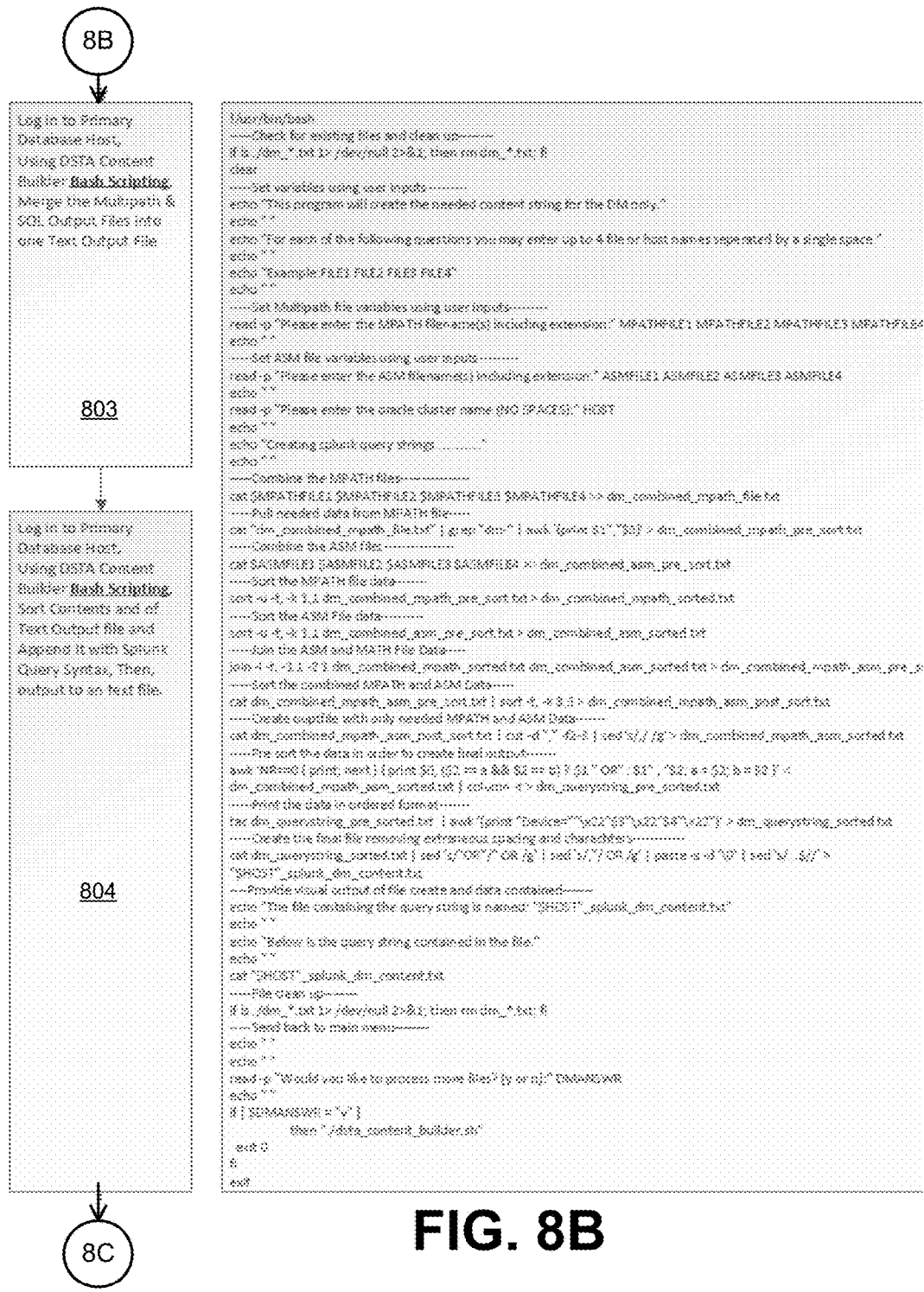

FIGS. 8A-C illustrates a process for building a case and entering/importing/pasting that case into a query in accordance with aspects of the present disclosure. One or more of the steps in the process in FIGS. 8A-C may be performed by the Database Storage Throughput Analyzer (DSTA) tool. To perform the steps of FIGS. 8A-C, the Database Storage Throughput Analyzer (DSTA) tool may interface with a database (e.g., database 205) that the query is developed to analyze. The process may include a step 801 of executing a command line utility (e.g., MULTIPATH II) that provides information on multipathing of one or more device managers 316 in the database. Step 801 may include logging into each database host using LINUX's multipath utility and extracting an ASM/DM alias (e.g., "asm_dm100") and a device manager's 316 number (e.g., "dm−1"). Step 801 may also include saving the output (the ASM/DM alias and device manager number) to a text file in predefined directory (e.g., a temporary director of the primary database host). In the output, the ASM/DM alias may be associated with the device manager number (e.g., in a same row or same column of a table).

In some embodiments, step 801 may be executed by entering a particular command line, such as "Multipath— 11 >/tmpMPFile MMDDYY.csv" into the Database Storage Throughput Analyzer (DSTA) tool. In some cases, step 801 may only be performed by the Database Storage Throughput Analyzer (DSTA) tool when such tool has particular authentication credentials for a particular access level (e.g., a host root admin access level). The Database Storage Throughput Analyzer (DSTA) tool might only have the particular authentication credentials based on its user at a given time.

After step 801, the Database Storage Throughput Analyzer (DSTA) tool may perform step 802. Step 802 may include logging into each database instance using SQL commands and extracting an ASM/DM alias (e.g., "asm_dm100") and an ASM group name (e.g., "DATA" for ASM group 311). Step 802 may also include saving the output (the ASM/DM alias(es) and ASM group name(s)) to a text file in predefined directory (e.g., a temporary director of the primary database host). This predefined directory may be the same or a different directory than the one used for saving the output of step 801. In the output of step 802, the ASM/DM alias may be associated with the ASM group name (e.g., in a same row or same column of a table).

In some embodiments, step 802 may be executed by entering a particular command lines, such as "Select lower (Decode(substr(r.path,1,4), 'ORCL', substr(r.path,6), '/dev', substr(substr(r.path,13), 1, length(substr(r.path,13)–2))) path, Decode(substr(k.name,1,4), 'SHAR', substr(k.name, instr(k.name,'_',1,1)+1, instr(k.name,'_',1,2)–instr(k.name, '_',1,1)–1), 'CRS_',substr(k.name,1,3), GGAT', k.name) name from v$asm_disk r, v$asm_diskgroup k Where r.group_number=k.group_number and r.header_status='MEMBER' order by 2" into the Database Storage Throughput Analyzer (DSTA) tool. These command lines may be stored in a file accessible to the Database Storage Throughput Analyzer (DSTA) tool. In some cases, step 802 may only be performed by the Database Storage Throughput Analyzer (DSTA) tool when such tool has particular authentication credentials for a particular access level (e.g., a database root admin access level). The Database Storage Throughput Analyzer (DSTA) tool might only have the particular authentication credentials based on its user at a given time.

After step 802, the Database Storage Throughput Analyzer (DSTA) tool may perform step 803. Step 803 may include logging into a primary host database and executing a script (e.g., BASH script) to merge the outputs of steps 801 and 802. In some examples, the merged data may be saved as one text file in a predefined directory (e.g., a temporary director of the primary database host). This predefined directory may be the same or a different directory than the one used for saving the outputs of steps 801 and 802.

In some embodiments, the BASH script executed in step 803 may include commands/instructions for prompting a user and reading user inputs. For example, the BASH script executed in step 803 may include the following code to set multipath file variables using user inputs:

read-p "Please enter the MPATH filename(s) including extension:"

echo " "

After step 803, the Database Storage Throughput Analyzer (DSTA) tool may perform step 804. Step 804 may include executing a script (e.g., BASH script) to sort contents of the text file produced by step 803, remove certain data (e.g., extraneous commas and spacing) from the contents, and/or append certain query syntax (e.g., SPLUNK query syntax) to the contents. In some examples, the same script may be used to perform both steps 803 and 804. Also, as a result of step 804, the contents with the appended syntax may be saved as a text file in a predefined directory (e.g., a temporary director of the primary database host). This predefined directory may be the same or a different directory than the one used for saving the outputs of steps 801-803.

In some embodiments, the BASH script executed in step 804 may include commands/instructions for appending syntax, such as "Device=" and quotes around certain parts of the sorted contents (e.g., device manager numbers). Such commands/instructions may include the following: tac dm_querystring_pre_sorted.txt|awk '{print "Device=" "\x22"$3"\x22"$4"\x22"}'>dm_querystring_sorted.txt.

These commands/instructions illustrate just some of the commands/instructions that may be in the BASH script that is accessible to and executed by the Database Storage Throughput Analyzer (DSTA) tool. Other commands/instructions are illustrated in the example BASH script included in FIG. 8B.

In some cases, steps 803 and 804 may only be performed by the Database Storage Throughput Analyzer (DSTA) tool when such tool has particular authentication credentials for a particular access level (e.g., a LINUX host user access level). The Database Storage Throughput Analyzer (DSTA) tool might only have these particular authentication credentials based on its user at a given time.

The right column of the table in FIG. 8C illustrates an example of an output of step 804. This output may be referred to as a case or case data. In step 805, the case may be transferred to a graphical user interface generator, such as SPLUNK. In some cases, step 805 may include performing copy (or cut) and paste operations. For example, a user may highlight the case generated/output in step 804, select to copy (e.g., by simultaneously pressing the control and "C" keys on a keyboard) or cut (e.g., by simultaneously pressing the control and "X" keys on a keyboard) the case, and paste (e.g., by simultaneously pressing the control and "V" keys on a keyboard) the case into a query. In some cases, the query is already pasted or loaded into a query builder of the graphical user interface generator (e.g., SPLUNK). In some cases, the Database Storage Throughput Analyzer (DSTA) tool may include an option for exporting the generated case to a graphical user interface generator, and step 805 may include selection of such an option. In some instances, the graphical user interface generator (e.g., SPLUNK) may have an option for inputting the case, and step 805 may include selection of such an option which causes the graphical user interface generator to retrieve the case generated in step 804 and to input it into a case data placeholder (e.g., variable) within a query.

Once the case is inputted into the query, the query may be executed to cause the graphical user interface generator (e.g., SPLUNK) to analyze storage throughput data and output graphical interfaces according to the query.

Figure 9A:
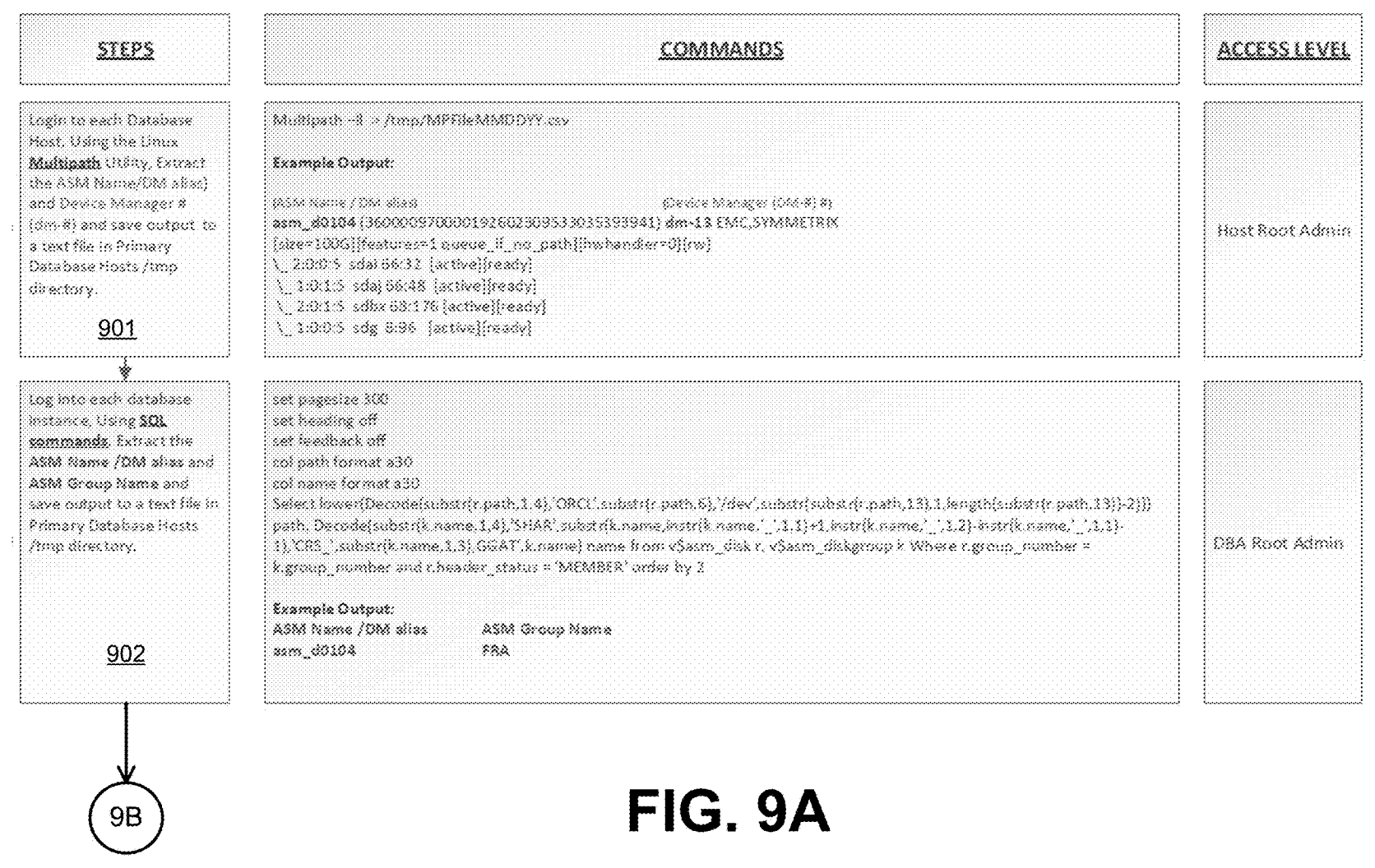
Figure 9B:
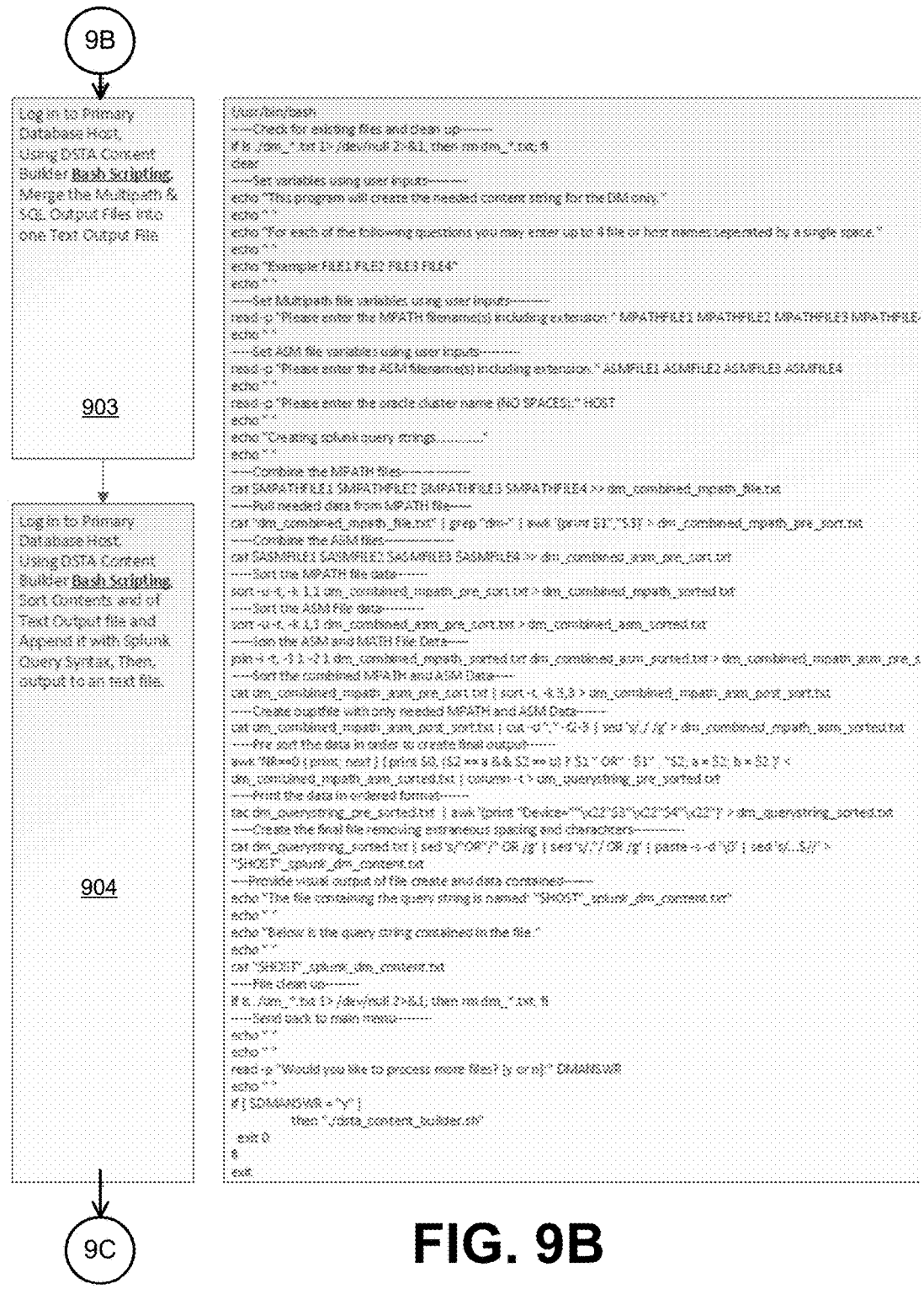

FIGS. 9A-C illustrate yet another process for building a case and entering/importing/pasting that case into a query in accordance with aspects of the present disclosure. One or more of the steps in the process in FIGS. 9A-C may be performed by the Database Storage Throughput Analyzer (DSTA) tool. To perform the steps of FIGS. 9A-C, the Database Storage Throughput Analyzer (DSTA) tool may interface with a database (e.g., database 205) that the query is developed to analyze. Steps 901-905 may be similar to steps 801-805, respectively. The main difference between the process of FIGS. 9A-C and the process of FIGS. 8A-C is that the process in FIGS. 8A-C analyzes the storage throughput at an ASM group (e.g., ASM group 311) level whereas the process of FIGS. 9A-C analyzes the storage throughput at the device manager 316 level.

Figure 10A:

FIGS. 10A-H illustrate an example of a portion of a query. The parts of FIGS. 10A-H may be executed in the order that they are depicted herein (e.g., FIG. 10A, then FIG. 10B, then FIG. 10C and so on) or in a different order. FIG. 10A illustrates where and how the query inputs case data (which may be generated by the processes of FIGS. 8A-C and 9A-C). The query may be executed to generate graphs (See FIGS. 11A-E) depicting the storage throughput data associated with certain ASM groups (e.g., ASM groups 311, 312, 313) and/or device managers 316.

As illustrated in FIGS. 10A-H, the query may perform one or more of the following functions: (1) start the creation of a dashboard and dashboard header (e.g., SPLUNK dashboard); (2) set variables to be used for each panel of the dashboard and (3) define default values for such variables; (4) set index and SLO variables; (5) set device manager list variable based on content (e.g., case data) generated by DTSA tool; (6) build host device dropdown list and define default value(s); (7) build time range dropdown list and define default value(s); (8) build interval (or granularity) dropdown list and define default interval; (9) build links to other dashboards, external utilities, and knowledgebases; (10) create panel with graph showing MB/s for a specific (e.g., user designated) disk group or ASM group; (11) create panel with graph showing iop/s; (12) create panel with graph showing AWAIT times; and (13) create panel with graph showing service times. Although the query in FIGS. 10A-H is specifically designed for execution by SPLUNK, a person of ordinary skill in the art would understand that a similar query could be executed by the Database Storage Throughput Analyzer (DSTA) tool itself or designed for another third party computer program/application.

In the figures, "dm" or "DM" may refer to a device manager 316. Also, "DSTA" may refer to the Database Storage Throughput Analyzer (DSTA) tool or a component thereof.

Figure 11A:
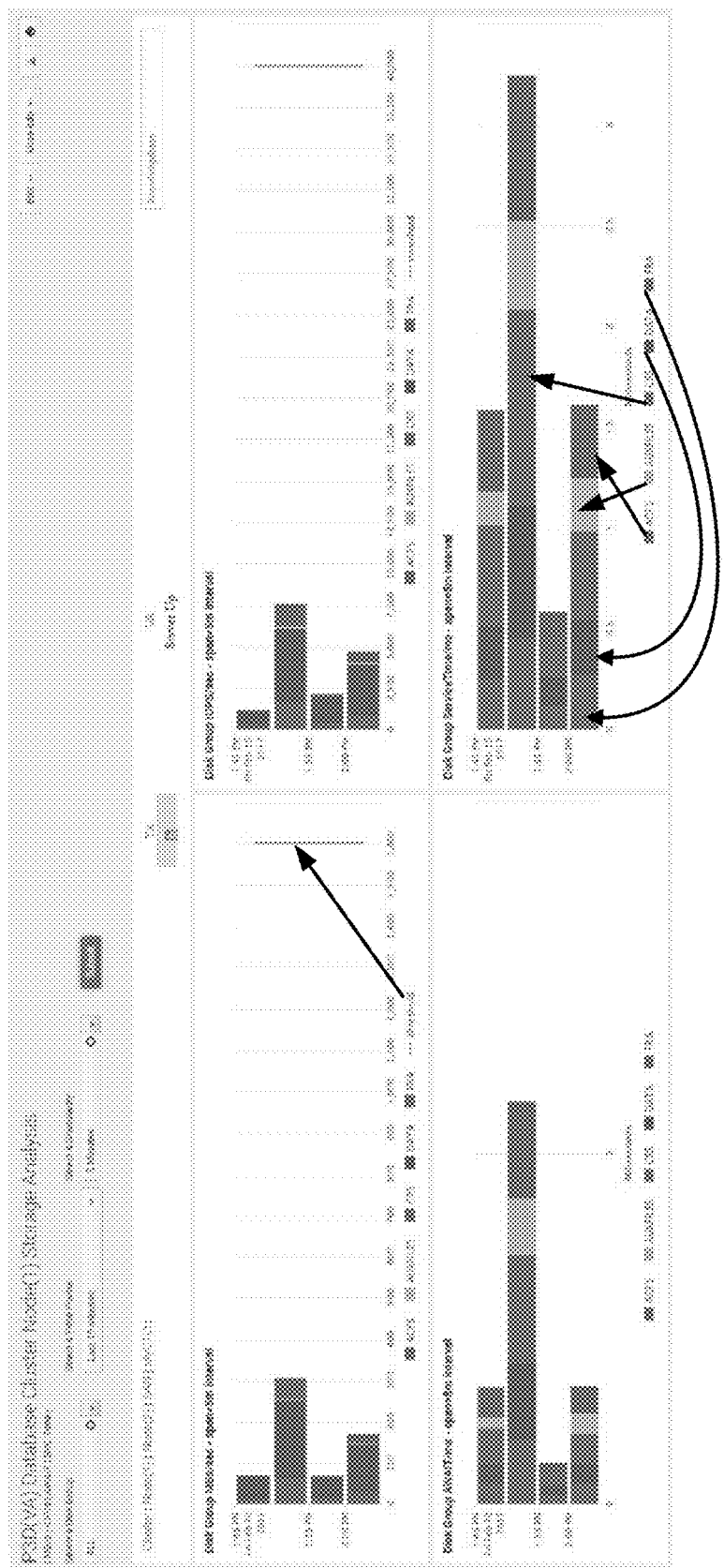
FIGS. 11A-E illustrate an example output of executing a query in accordance with aspects described herein.
Figure 11B:
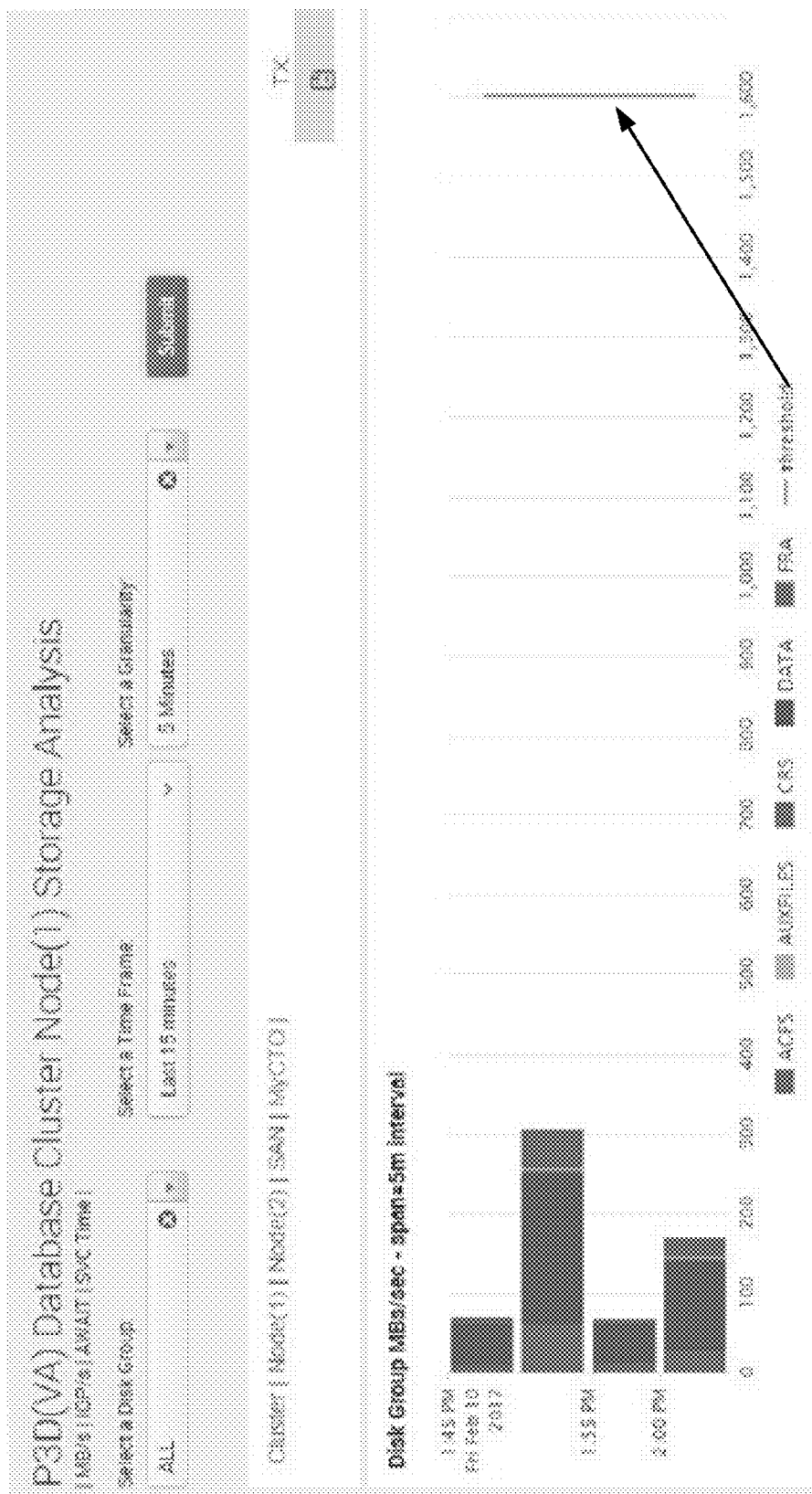
Figure 11C:
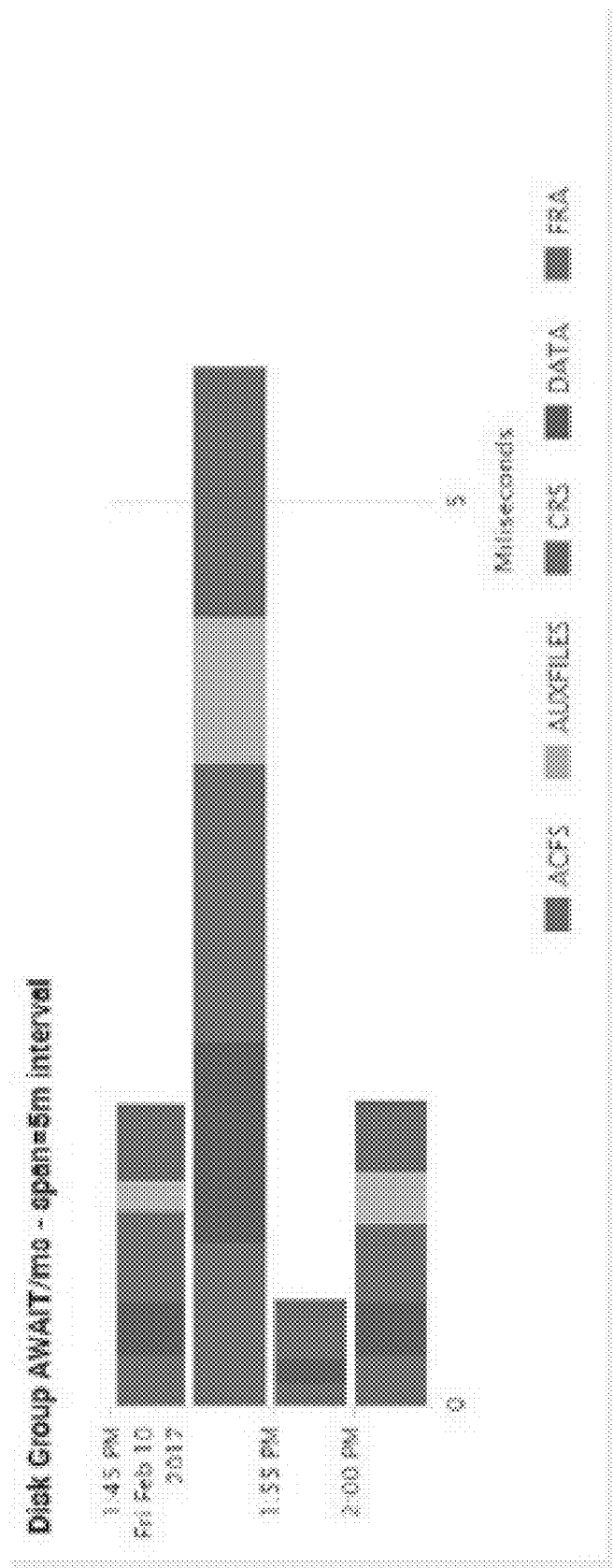
Figure 11D:
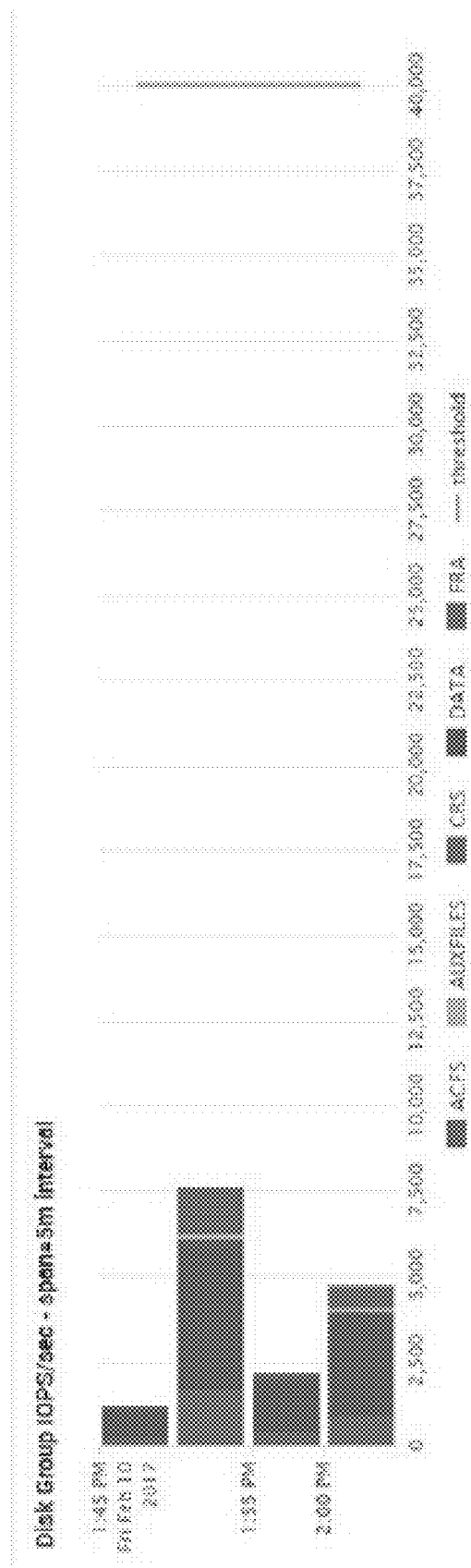
Figure 11E:
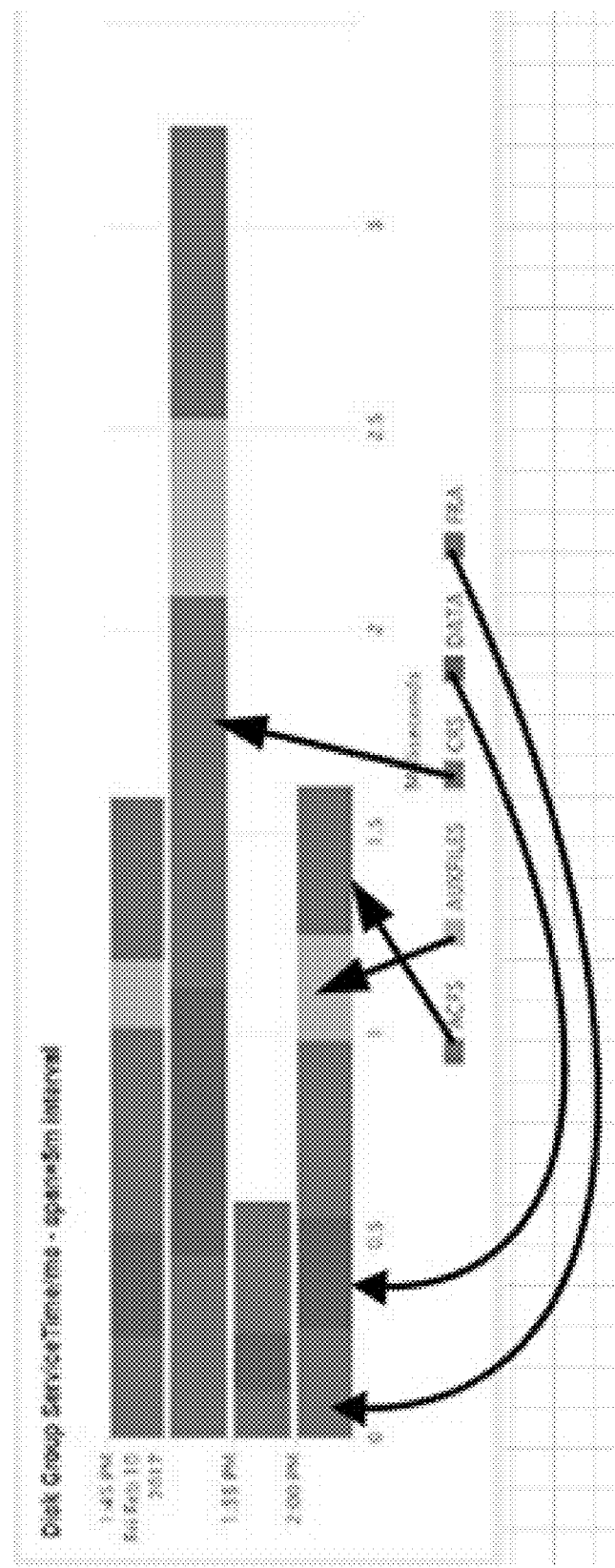

FIG. 11A illustrates example graphs that may be output as a result of executing the query. As shown in FIG. 11A, four different graphs may be output at once to depict different storage throughput measurements (e.g., MB/s, iop/s, AWAIT/ms, and service time/ms). FIG. 11B illustrates a close up of the upper-left graph of FIG. 11A. FIG. 11C illustrates a close up of the lower-left graph of FIG. 11A. FIG. 11D illustrates a close up of the upper-right graph of FIG. 11A. FIG. 11E illustrates a close up of the lower-right graph of FIG. 11A.

In FIG. 11A, an interval (or granularity) of five minutes is selected (see FIG. 11B), so each bar in the bar graphs represents storage throughput data over a five minute interval. Further, each bar may include multiple portions having different colors indicating the different types of data that contributed to the storage throughput data during a particular five minute interval. A legend in proximity to each bar graph illustrates which colors correspond to which types of data. For example, the "FRA" data may be associated with the color green, "DATA" data may be associated with the color purple, "CRS" data may be associated with the color red, "AUXFILES" data may be associated with the color yellow, and "ACFS" data may be associated with the color blue. Arrows in the bottom-right graph of FIG. 11A and the close up of FIG. 11E show how the legend helps identify the different portions of the bars. Further, an arrow in the top-left graph of FIG. 11A and the close up of FIG. 11B illustrates how a threshold (which may be based on an SLO) may be indicated in the graphs as well.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Further, one or more aspects described with respect to one figure or arrangement may be used in conjunction with other aspects associated with another figure or portion of the description.

What is claimed is:

1. A system, comprising:
   a client device configured to access a storage throughput analyzer tool;
   a database configured to support the client device in accessing the storage throughput analyzer tool, the database comprising a plurality of database clusters, each database cluster comprising at least one host device;
   a storage array configured to provide information to the database, the storage array comprising a plurality of storage devices storing the information; and
   a computing device comprising a hardware processor that causes the computing device to:
      execute the storage throughput analyzer tool in response to a triggering event from the client device;
      specify, using the storage throughput analyzer tool, an interval of time at which to evaluate storage throughput data of the database, the interval being one minute or less;
      specify, using the storage throughput analyzer tool, a service level objective including at least a size of storage throughput data of the database from the client device;
      generate, based on the service level objective, a query that specifies the size of storage throughput data, generating the query including:
         executing a first command line utility to provide one or more device managers of the plurality of storage devices;

identifying one or more aliases of the one or more device managers based on the one or more device managers;

executing a second command line utility to provide one or more volumes that support the database;

matching the one or more aliases with the one or more volumes;

executing a script to obtain a database portion that includes a group of one or more host devices of the at least one host device;

providing results based on the database portion and the matched one or more aliases and one or more volumes to generate the query;

receive, from a system hosting the database, storage throughput measurements of the database at the interval;

apply the query to the storage throughput measurements; and generate and provide an output based on the query to the client device.

2. The system of claim 1, wherein the output is a graph.

3. The system of claim 2, wherein the graph is a bar graph comprising a plurality of bars.

4. The system of claim 3, wherein each of the plurality of bars represents an aggregate of a portion of storage throughput measurements for the interval.

5. The system of claim 4, wherein the hardware processor further causes the computing device to specify a particular database cluster among the plurality of database clusters, and wherein each of the plurality of bars is based on storage throughput measurements associated with the particular database cluster.

6. The system of claim 4, wherein the plurality of bars is arranged vertically, and wherein the bar graph comprises a horizontal line representing the service level objective.

7. The system of claim 1, wherein the hardware processor further causes the computing device to:

determine whether at least one of the storage throughput measurements exceeds the service level objective; and in response to determining that at least one of the storage throughput measurements exceeds the service level objective, output an alert.

8. The system of claim 7, wherein the hardware processor further causes the computing device to:

prior to outputting the alert, determine whether the alert is to be outputted; and in response to determining that the alert is to be outputted, determine how the alert is to be output and to where the alert is to be output; and outputting the alert based on the determination.

9. A non-transitory computer-readable storage medium storing computer-executable instructions that, when executed by a hardware processor, cause the computing device to:

configure a database, the database comprising a plurality of database clusters, each database cluster comprising at least one host device;

configure a storage array to provide information to the database, the storage array comprising a plurality of storage devices storing the information;

execute a storage throughput analyzer tool in response to a triggering event from a client device;

specify a service level objective from the client device using a storage throughput analyzer tool for controlling communications between a database and a storage array, the service level objective including at least a size of storage throughput data of the database;

specify an interval of time at which to evaluate storage throughput data of the database, the interval being one minute or less;

generate, based on the service level objective, a query that specifies the size of the storage throughput data, generating the query including:

executing a first command line utility to provide one or more device managers of the plurality of storage devices;

identifying one or more aliases of the one or more device managers based on the one or more device managers;

executing a second command line utility to provide one or more volumes supporting the database;

matching the one or more aliases with the one or more volumes;

executing a script to obtain a database portion that includes a group of one or more host devices of the at least one host device;

providing results based on the database portion and the matched one or more aliases and the one or more volumes to generate the query;

receive, from a system hosting the database, storage throughput measurements of the database at the interval;

apply the query to the storage throughput measurements; and generate and provide an output based on the query to the client device.

10. The non-transitory computer-readable storage medium of claim 9, wherein the output is a graph.

11. The non-transitory computer-readable storage medium of claim 10, wherein the graph is a bar graph comprising a plurality of bars.

12. The non-transitory computer-readable storage medium of claim 11, wherein each of the plurality of bars represents an aggregate of a portion of storage throughput measurements for the interval.

13. The non-transitory computer-readable storage medium of claim 12, wherein the computer-executable instructions, when executed by the hardware processor, further cause the computing device to specify a particular database cluster among the plurality of database clusters, and wherein each of the plurality of bars is based on storage throughput measurements associated with the particular database cluster.

14. The non-transitory computer-readable storage medium of claim 12, wherein the plurality of bars is arranged vertically, and wherein the bar graph comprises a horizontal line representing the service level objective.

15. The non-transitory computer-readable storage medium of claim 9, wherein the computer-executable instructions, when executed by the hardware processor, further cause the computing device to:

determine whether at least one of the storage throughput measurements exceeds the service level objective; and in response to determining that at least one of the storage throughput measurements exceeds the service level objective, output an alert.

16. A method, comprising:
configuring, by a computing device, a database, the database comprising a plurality of database clusters, each database cluster comprising at least one host device;
configuring, by the computing device, a storage array to provide information to the database, the storage array comprising a plurality of storage devices storing the information;
executing, by the computing device, a storage throughput analyzer tool in response to a triggering event from a client device;
specifying, by a computing device, a service level objective from the client device using a storage throughput analyzer tool for controlling communications between a database and a storage array, the service level objective including at least a size of storage throughput data of the database;
specifying an interval of time at which to evaluate storage throughput data of the database, the interval being one minute or less;
generating, by the computing device and based on the service level objective, a query that specifies the size of storage throughput data, generating the query including:
  executing a first command line utility to provide one or more device managers of the plurality of storage devices;
  identifying one or more aliases of the one or more device managers based on the one or more device managers;
  executing a second command line utility to provide one or more volumes supporting the database;
  matching the one or more aliases with the one or more volumes;
  executing a script to obtain a database portion that includes a group of one or more host devices of the at least one host device;
  providing results based on the database portion and the matched one or more aliases and one or more volumes to generate the query;
receiving, from a system hosting the database, storage throughput measurements of the database at the interval;
applying the query to the storage throughput measurements; and
generating and providing an output based on the query to the client device.

17. The method of claim 16, wherein the output is a bar graph comprising a plurality of bars, wherein each bar represents an aggregate of a portion of the storage throughput measurements for the specified interval, and wherein at least one of the plurality of bars comprises at least two portions having different colors representing different types of data being exchanged between the database and the storage array.

18. The method of claim 17, further comprising:
specifying a particular database cluster among the plurality of database clusters, wherein each of the plurality of bars is based on storage throughput measurements associated with the particular database cluster.

* * * * *